(12) United States Patent
Koito et al.

(10) Patent No.: US 8,681,306 B2
(45) Date of Patent: Mar. 25, 2014

(54) LIQUID CRYSTAL DISPLAY DEVICE AND A METHOD OF MANUFACTURING THE SAME

(75) Inventors: Takeo Koito, Kanagawa (JP); Tsutomu Tanaka, Kanagawa (JP); Hidehiro Kosaka, Kanagawa (JP)

(73) Assignee: Japan Display West Inc., Aichi (JP)

( * ) Notice: Subject to any disclaimer, the term of this patent is extended or adjusted under 35 U.S.C. 154(b) by 1093 days.

(21) Appl. No.: 12/575,609

(22) Filed: Oct. 8, 2009

(65) Prior Publication Data

US 2010/0097548 A1    Apr. 22, 2010

(30) Foreign Application Priority Data

Oct. 16, 2008 (JP) .................. 2008-267857

(51) Int. Cl.
*G02F 1/1339* (2006.01)
(52) U.S. Cl.
USPC .......................... 349/155; 349/156
(58) Field of Classification Search
USPC ................. 349/106, 110, 155, 156
See application file for complete search history.

(56) References Cited

U.S. PATENT DOCUMENTS

| 5,815,232 | A | * | 9/1998 | Miyazaki et al. | 349/155 |
| 5,995,191 | A | * | 11/1999 | Tamai et al. | 349/156 |
| 8,284,372 | B2 | * | 10/2012 | Aizawa et al. | 349/155 |
| 2005/0117097 | A1 | * | 6/2005 | Noguchi et al. | 349/114 |
| 2005/0185129 | A1 | * | 8/2005 | Kim et al. | 349/156 |
| 2005/0185130 | A1 | * | 8/2005 | Oh et al. | 349/156 |
| 2005/0270472 | A1 | * | 12/2005 | Yamada et al. | 349/156 |
| 2007/0139604 | A1 | | 6/2007 | Paik et al. | |

FOREIGN PATENT DOCUMENTS

| JP | 2005-122150 | | 5/2005 |
| JP | 2005-208583 | A | 8/2005 |
| JP | 2005-242309 | A | 9/2005 |
| JP | 2006-330470 | A | 12/2006 |
| JP | 2007-164134 | A | 6/2007 |
| TW | 200525194 | A | 8/2005 |

OTHER PUBLICATIONS

Japanese Patent Office, Office Action issued in Patent Application JP 2008-267857, on Aug. 24, 2010.
Japanese Patent Office, Office Action issued in Patent Application JP 2008-267857, on Nov. 24, 2010.
Taiwanese Office Action issued in connection with Taiwan Patent Application No. 098132576 dated Aug. 29, 2013.

* cited by examiner

*Primary Examiner* — Edward Glick
*Assistant Examiner* — David Chung
(74) *Attorney, Agent, or Firm* — Dentons US LLP

(57) ABSTRACT

Disclosed herein is a liquid crystal display device, including: a first substrate; a second substrate; a plurality of spacers disposed between the first substrate and the second substrate; and a liquid crystal layer filled between the first substrate and the second substrate supported by the plurality of spacers; wherein each of the plurality of spacers has a multiple step structure having one or more steps.

4 Claims, 18 Drawing Sheets

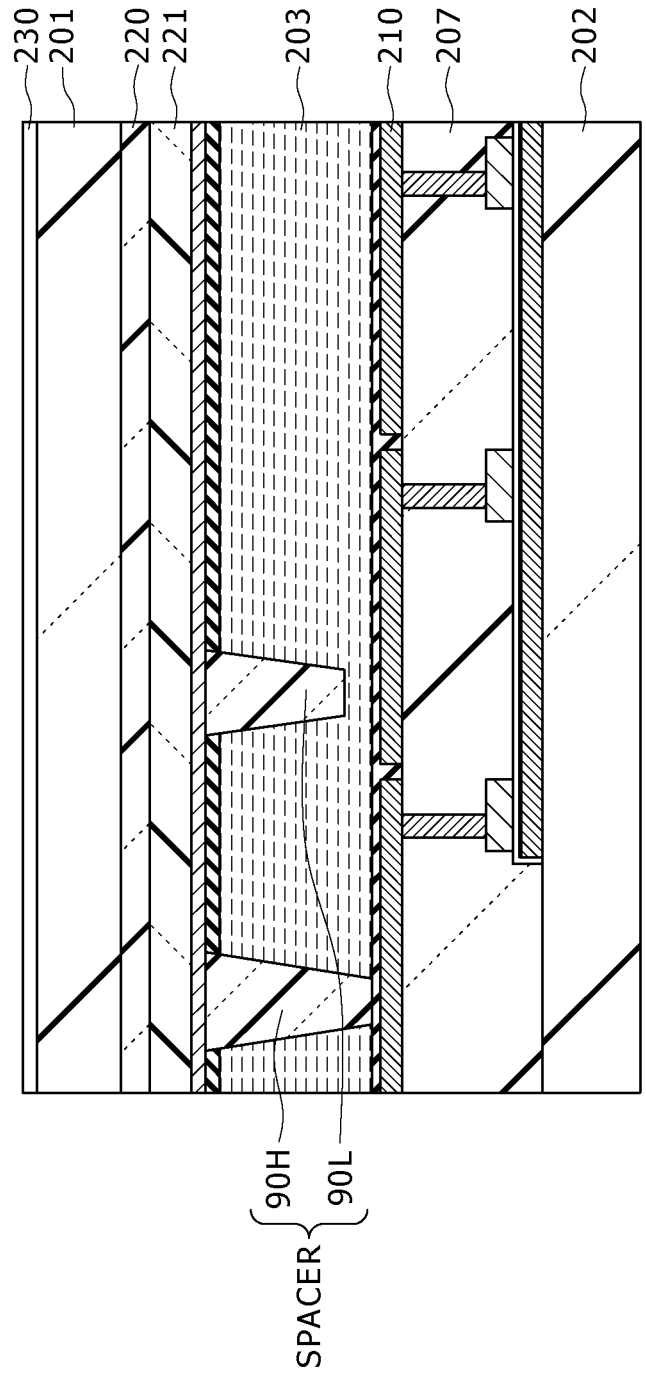

(DEVELOPMENT)

(DEVELOPMENT)

FIG.7A
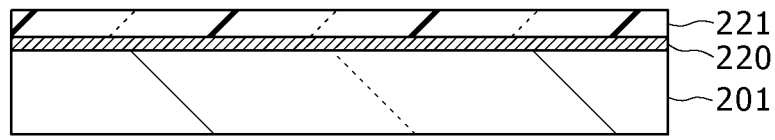
FIG.7B
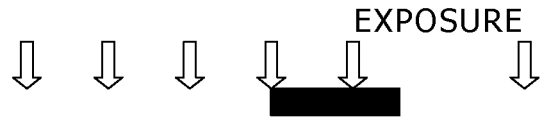
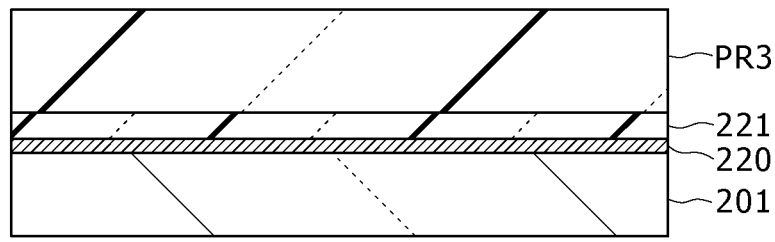
FIG.7C
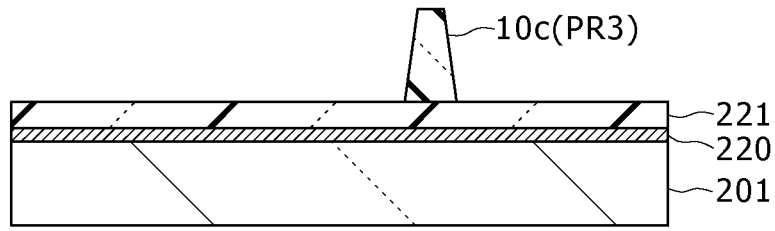
FIG.7D
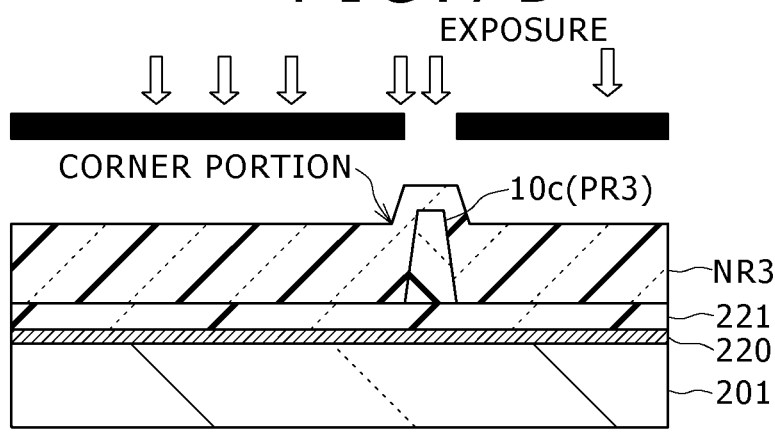
FIG.7E
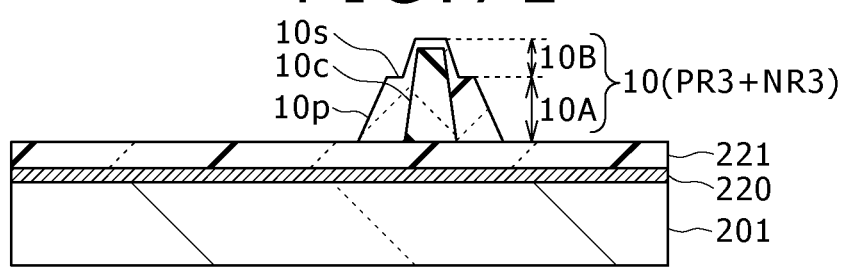

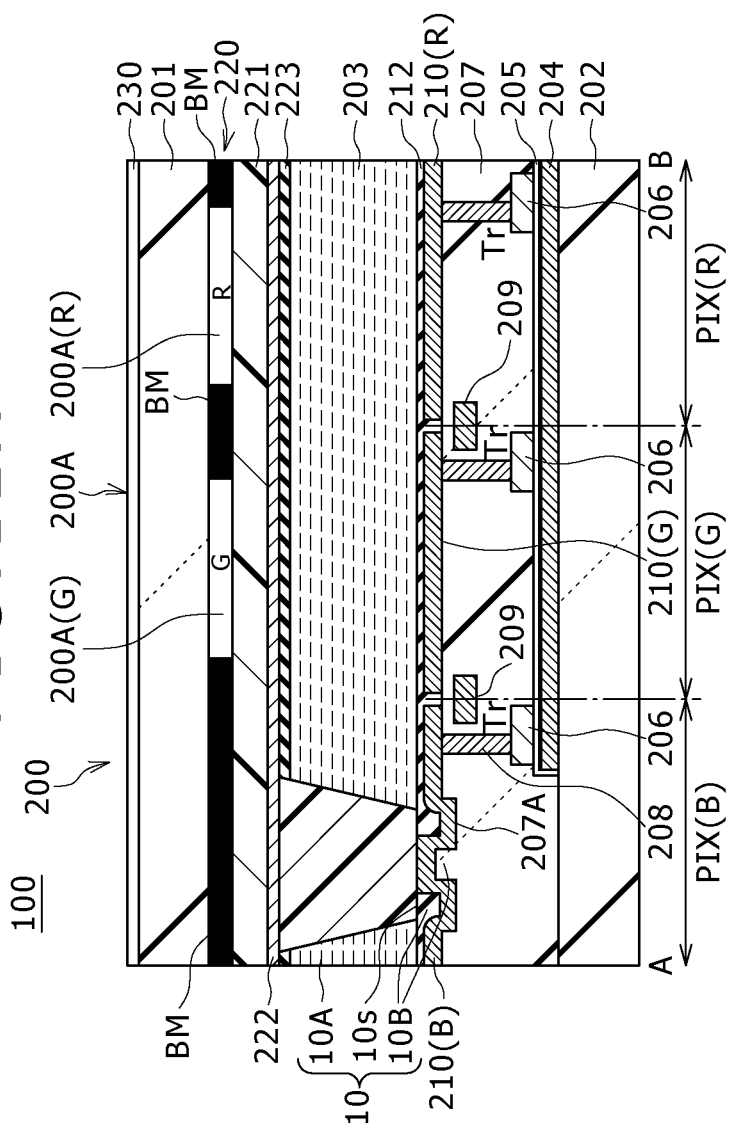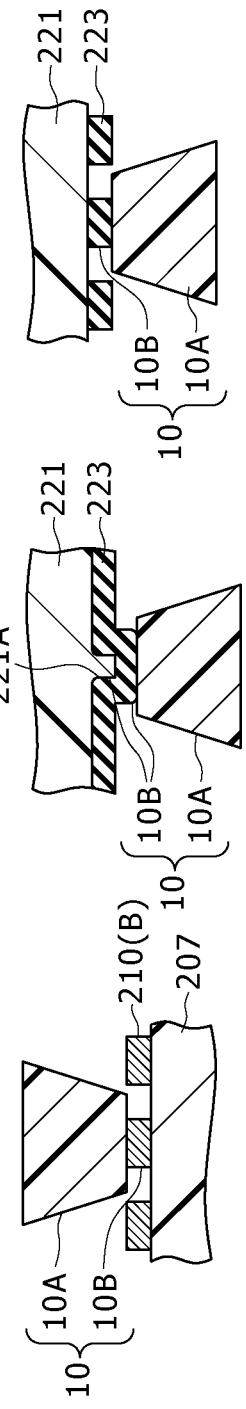

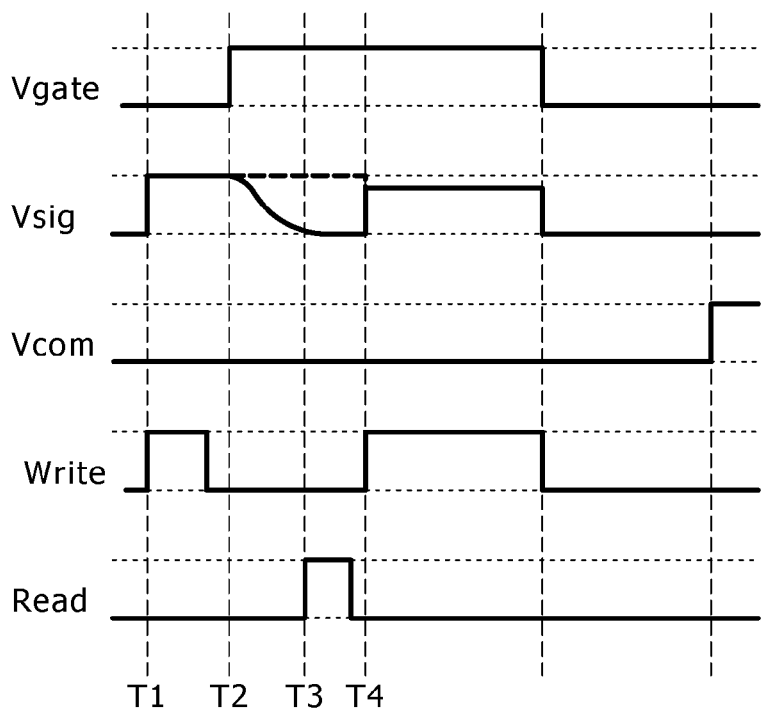

LIQUID CRYSTAL DISPLAY DEVICE AND A METHOD OF MANUFACTURING THE SAME

BACKGROUND OF THE INVENTION

1. Field of the Invention

The present invention relates to a liquid crystal display device having a spacer for holding a gap with which a liquid crystal is enclosed between two sheets of substrates referred to as so-called a drive substrate and a counter substrate, respectively, and a method of manufacturing the same.

2. Description of the Related Art

A liquid crystal display device has advantages such as thinning, lightweight, and low power consumption. For this reason, many liquid crystal display devices are used in electronic apparatuses for mobile applications such as a mobile phone and a digital camera.

The liquid crystal display device has a liquid crystal panel in which a liquid crystal is enclosed between a pair of substrates. With the liquid crystal display device, the liquid crystal panel modulates a light radiated from a flat surface light source such as a backlight provided on a back surface of the liquid crystal panel. Also, display of an image is carried out on a front surface (on a side of viewing a display surface) of the liquid crystal panel by the modulated light.

In recent years, a liquid crystal display device has been realized that has a sensor function called "a touch panel" with which data representing contents instructed by a user is directly inputted by utilizing an icon or the like displayed on a screen of the liquid crystal display device.

The touch panel is installed on the display surface side of the liquid crystal display device so that the instructed contents shown on the screen of the liquid crystal display device can be selected with a hand of an operator or an object (for example, a stylus pen). When the hand of the operator or the object directly touches the touch panel, the touch panel detects a position within the panel surface which the hand of the operator or the object touches. The liquid crystal display device receives the instructed contents as an input signal in accordance with the position where the contact is detected, and carries out an operation based on the input signal.

When the liquid crystal display device including the touch panel is used in a computer or the like, there is no need for providing an input unit as an attached accessory, other than a main body and a display device, such as a keyboard or a mouse. Or, the touch panel provides another input unit which assists such an input unit. In addition, when the touch panel is used in a mobile product such as a mobile phone, there is no need for providing an input unit such as a keyboard, or the number of keys can be reduced.

From the above, when the touch panel is mounted to the liquid crystal display device, the number of special attached accessories is reduced. For the side of the product provider, when the number of attached accessories is less, there is provided an advantage that the flexibility of the product design increases, and thus the miniaturization and the convenience enhancement are progressed, thereby increasing the product power. This provides the advantages such as the price-reduction, high functionality and convenience enhancement of the product for the user side as well. For this reason, the use of the touch panel has a tendency to increase yearly.

A liquid crystal display device in which a touch panel is added to a display surface side of a liquid crystal display panel is known in terms of a method of mounting the touch panel.

However, it is disadvantageous to add the touch panel externally for thinning the liquid crystal display device, which results in an increase in manufacturing cost. In addition, in the liquid crystal display device to which the touch panel is externally added, the optical characteristics in a phase of image display changes due to an influence of a refractive interface, so that the visibility of the image is reduced. For this reason, it is studied that the liquid crystal display panel and the touch panel are formed integrally with each other.

Moreover, when such a liquid crystal display panel is actually used, if a pressure is applied from the outside to the liquid crystal display panel, the spacer or a supporting body therefor is remarkably deformed due to surface pressing or the like because of the thinning of a glass.

With regard to the reason for this, it is given that when the liquid crystal display panel is used as the touch panel, a large load is applied to the touch panel, and when the glass is thinned, a pressure applied to the spacer determining a cell gap is not dispersed, and thus a load per one spacer becomes large.

With regard to measures to cope with this situation, it is the most effective measures to increase a disposition density of the spacer.

However, when an area occupancy as a rate of a spacer area per unit area is increased, there is caused a problem that when an impact is applied to the liquid crystal layer, vacuum babbles (so-called low-temperature bubbles) are generated.

This results from that although when the impact is applied to the spacers under a low-temperature environment, a cell gap saps downward and immediately restores to the original state, the bubbles are generated inside the cell because a restoration speed against the impact applied to the liquid crystal layer cannot follow a restoration speed of a member such as a glass.

The bubbles are generated because the glass quickly restores to the original state when the spacer area occupancy is high. Thus, the spacer area occupancy and the prevention of generation of the bubbles show a trade-off relationship.

With regard to the measures to cope with the low-temperature bubbles, there is known a technique for taking the measures to cope with the low-temperature bubbles by changing heights of spacers. This technique, for example, is described in Japanese Patent Laid-Open No. 2005-122150.

SUMMARY OF THE INVENTION

However, such spacers different in height from one another results in an increase in the number of processes in manufacturing, and are difficult in control, which results in the low mass productivity.

The present invention has been made in order to solve the problems described above, and it is therefore desirable to provide a liquid crystal display device which has a spacer having a structure allowing a trade-off relationship between a supporting strength of a spacer, and prevention of generation of low-temperature bubbles to be dissolved or relaxed, and a method of manufacturing the same.

In order to attain the desire described above, according to an embodiment of the present invention, there is provided a liquid crystal display device, including: a first substrate; a second substrate; a plurality of spacers disposed between the first substrate and the second substrate; and a liquid crystal layer filled between the first substrate and the second substrate supported by the plurality of spacers; in which each of the plurality of spacers has a multiple step structure having one or more steps.

In the structure described above, a cross-sectional area of the spacer on one side with respect to the step in a height direction of the spacer is relatively large, and a cross-sectional area of the spacer on the other hand with respect to the step is relatively small. The large cross-sectional area side can be made to function as a supporting body (spacer). On the other hand, it is possible to obtain such a cross-sectional area as to adjust a restoring force against low-temperature bubbles by using the smaller cross-sectional area. That is to say, it is possible to realize with the spacer structure that when a large external pressure is applied to the spacer, although the spacer is deformed to a certain extent, the spacer is not readily deformed any more, and the low-temperature bubbles are prevented from being generated. The reason for this is that since when the external pressure is released, the restoring force of the substrate depends on a coupling force of the portion having the smaller cross-sectional area, the coupling force of the portion having the smaller cross-sectional area can be optimized for prevention of the generation of the low-temperature bubbles.

According to another embodiment of the present invention, there is provided a method of manufacturing a liquid crystal display device, including the steps of: forming a plurality of spacers for holding a first substrate and a second substrate at a predetermined facing interval in at least one of the first substrate and the second substrate between which a liquid crystal layer is held; and sticking the first substrate and the second substrate to each other through the plurality of spacers, and enclosing a liquid crystal within a gap defined by the predetermined facing interval; in which the step of forming the plurality of spacers includes the step of: carrying out two multiple exposures for one resist applied film in exposure areas having different areas either after the formation of the plurality of spacers or after the sticking of the first substrate and the second substrate so that a multiple step structure having one or more steps is formed.

According to still another embodiment of the present invention, there is provided a method of manufacturing a liquid crystal display device including the steps of: forming a plurality of spacers for holding a first substrate and a second substrate at a predetermined facing interval in at least one of the first substrate and the second substrate between which a liquid crystal layer is held; and sticking the first substrate and the second substrate to each other through the plurality of spacers, and enclosing a liquid crystal within a gap defined by the predetermined facing interval; in which the step of forming the plurality of spacers includes the step of: forming two layer resist patterns having different areas by repetitively carrying out exposure and development twice either after the formation of the plurality of spacers or after the sticking of the first substrate and the second substrate so that a multiple step structure having one or more steps is formed.

According to yet another embodiment of the present invention, there is provided a method of manufacturing a liquid crystal display device including the steps of: forming a plurality of spacers for holding a first substrate and a second substrate at a predetermined facing interval in at least one of the first substrate and the second substrate between which a liquid crystal layer is held; and sticking the first substrate and the second substrate to each other through the plurality of spacers, and enclosing a liquid crystal within a gap defined by the predetermined facing interval; in which the step of forming the plurality of spacers includes the steps of: forming a first resist pattern becoming a core portion on the first substrate either after the formation of the plurality of spacers or after the sticking of the first substrate and the second substrate so that a multiple step structure having one or more steps is formed; and forming a second resist pattern so as to cover the first resist pattern thus formed, a step being formed on an outside surface of the second resist pattern due to presence of the first resist pattern.

According to the present invention, it is possible to either dissolve or relax the trade-off relationship between the supporting strength of the spacer, and the prevention of the generation of the low-temperature bubbles. In addition, it is possible to simplify the manufacturing process for the relaxation of the trade-off relationship, and it is also possible to suppress the increase in cost as much as possible.

BRIEF DESCRIPTION OF THE DRAWINGS

FIG. 4 is a schematic cross sectional view showing a structure of a transmission type liquid crystal display device of comparative example of the first embodiment;

FIGS. 7A to 7E are cross sectional views showing processes for manufacturing a spacer in a transmission type liquid crystal display device according to a third embodiment of the present invention;

FIG. 12A, and FIGS. 12B to 12D are respectively a schematic cross sectional view showing a structure of a transmission type liquid crystal display device according to a sixth embodiment of the present invention, and partially enlarged views showing structures of changes of the sixth embodiment shown in FIG. 12A;

FIGS. 16A to 16E are waveform charts showing waveforms of pulses applied in a phase of contact detection in the eighth embodiment, voltages of signal lines, and the like;

DETAILED DESCRIPTION OF THE PREFERRED EMBODIMENTS

The preferred embodiments of the present invention will be described in detail hereinafter with reference to the accompanying drawings.

First Embodiment

Figure 1:
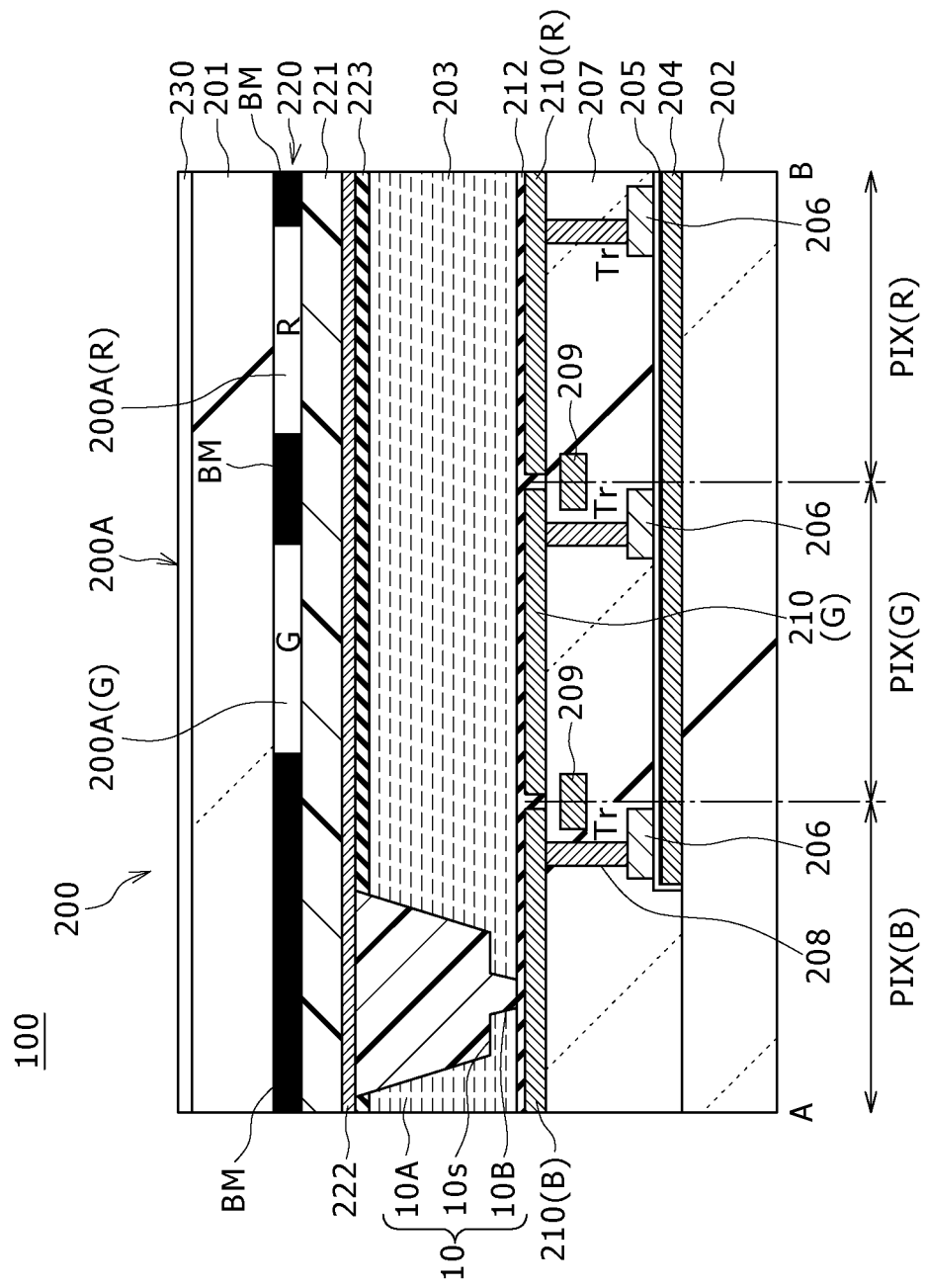
FIG. 1 is a schematic cross sectional view, showing a transmission type liquid crystal display device according to a first embodiment of the present invention, taken on line I-I of FIG. 2.
Figure 2:
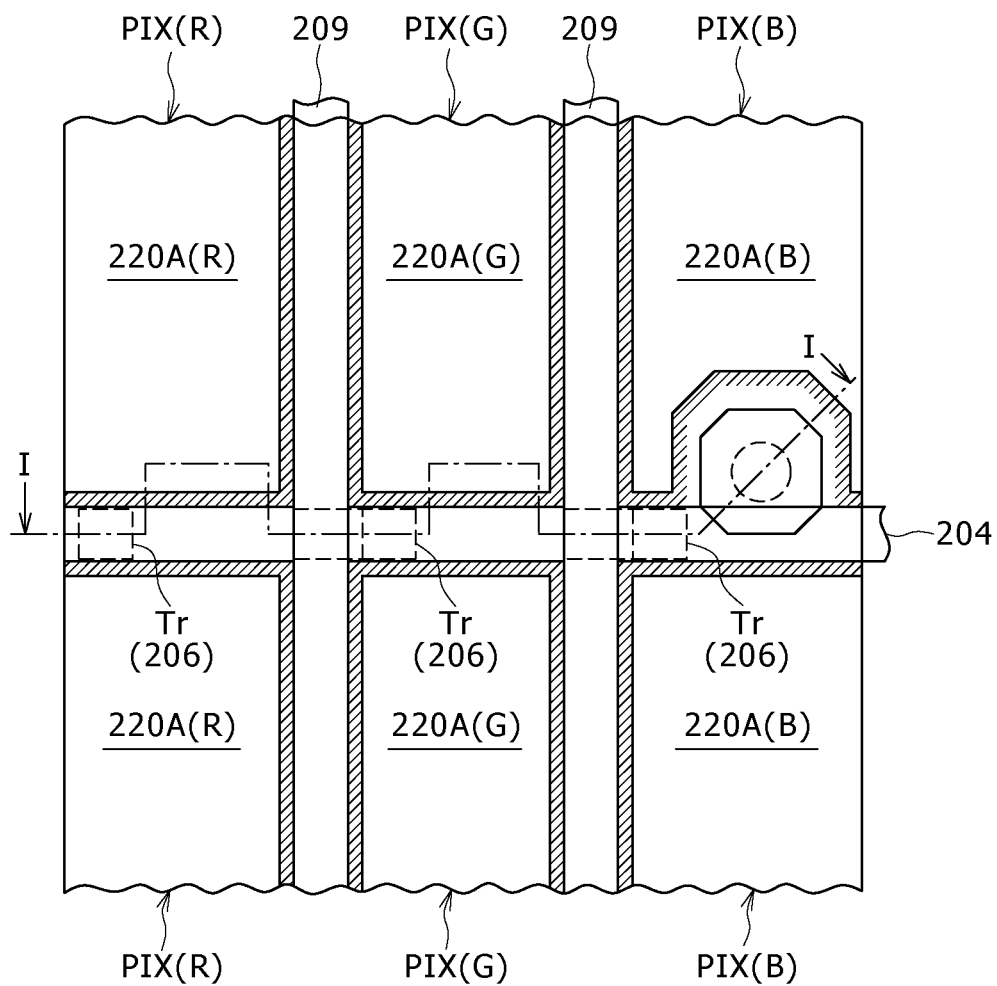
FIG. 2 is a simplified top plan view showing a structure of the vicinity of boundaries among six pixels in the transmission type liquid crystal display device according to the first embodiment of the present invention.

FIG. 1 is a schematic cross sectional view, showing a structure of a transmission type liquid crystal display device according to a first embodiment of the present invention, taken on line I-I of FIG. 2. FIG. 2 is a simplified plane transparent view showing a part of pixel areas which the transmission type liquid crystal display device of the first embodiment shown in FIG. 1 has.

The liquid crystal display device 100 illustrated in FIG. 1 has a liquid crystal panel 200, a backlight (not shown), and a drive portion (not shown) for driving the liquid crystal panel 200 and the backlight.

When viewed from the cross section shown in FIG. 1, in the liquid crystal panel 200, an upper side in FIG. 1 corresponds to "a display surface side," and a lower side in FIG. 1 corresponds to "a back surface side." The backlight is disposed on the back surface side so as to be close to the liquid crystal panel 200.

In the liquid crystal panel 200, a color filter substrate 201 as "a first substrate," and a TFT array substrate 202 as "a second substrate" face each other to define a gap between the color filter substrate 201 and the TFT array substrate 202. The TFT array substrate 202 is called "a drive substrate" as well, and the color filter substrate 201 is called "a counter substrate" as well.

Although details will be described later, pixel electrodes, wirings and transistors are respectively disposed in a matrix on the TFT array substrate 202. As a result, when, for example, viewed from the display surface side, a plurality of pixels PIXs are disposed in a matrix. The pixel PIX is a minimum unit at which a gradation can change.

In FIGS. 1 and 2, an R pixel which displays a red(R) color is designated by reference symbol "PIX(R)." Likewise, a G pixel which displays a green(G) color is designated by reference symbol "PIX(G)," and a B pixel which displays a blue (B) color is designated by reference symbol "PIX(B)."

As shown in FIG. 1, a liquid crystal layer 203 is formed so as to be held between the color filter substrate 201 and the TFT array substrate 202.

Although details will be descried later, after predetermined functional layers are laminated and formed on the color filter substrate 201 and the TFT array substrate 202, respectively, the two sheets of color filter substrate 201 and TFT array substrate 202 are disposed so as to face each other, and a liquid crystal is injected and sealed between the color filter substrate 201 and the TFT array substrate 202, thereby forming the liquid crystal layer 203.

The TFT array substrate 202 is made of a material, such as a glass, having a high degree of transparency, and a gate electrode 204 of a transistor Tr is formed on the TFT array substrate 202. A TFT layer 206 becoming a body area of the transistor Tr is formed on the gate electrode 204 through a thin gate insulating film 205. Referring to FIGS. 1 and 2, the gate electrode 204 is directly formed on the TFT array substrate 202. However, the gate electrode 204 may be formed on an insulating layer. In addition, although details are omitted in its illustration, an impurity is implanted into the TFT layer 206, thereby forming a source region and a drain region.

It is noted that the gate electrode 204 is lengthwise wired along a pixel boundary as shown in FIG. 2 to be used as scanning lines as well. Since the gate electrode 204 is made of a high-melting point metallic material such as molybdenum, when a wiring resistance of the gate electrode 204 is desired to be reduced, the gate electrode 204 is suitably connected to a wiring of an upper layer (not shown).

A multi-layer insulating film 207 is formed above the TFT array substrate 202 so as to burry therein the transistor Tr thus formed.

A conductive layer such as a plug 208 of the transistor Tr, and a signal line 209 formed from a metallic wiring made of aluminum or the like are buried in the multi-layer insulating film 207. Although not shown in FIG. 2, the signal line 209 is lengthwise wired in a direction perpendicularly intersecting with the gate electrode (scanning line) 204. The signal lines 209 are connected to the transistors Tr in portions not appearing in FIG. 2, respectively.

Pixel electrodes 210 are formed on the multi-layer insulating film 207 so as to be connected to the plugs 208, respectively. Each of the pixel electrodes 210 is made of a transparent electrode material.

The transmission type liquid crystal display device 100 of the first embodiment is a transmission type liquid crystal display device having "a VA ECB mode." For this reason, the pixel electrode 210 is disposed as one sheet of electrode having a large area over approximately the entire area of the pixel PIX.

Note that, in FIG. 1, reference symbol of the pixel electrode 210 of the R pixel PIX(R) is represented by "210(R)." Likewise, reference symbol of the pixel electrode 210 of the G pixel PIX(G) is represented by "210(G)," and reference symbol of the pixel electrode 210 of the B pixel PIX(B) is represented by "210(B)." In FIG. 2, the pixel electrodes 210(R), 210(G) and 210(B) are omitted in their illustrations for the sake of simplicity.

The pixel electrode 210 is an electrode through which an electric field is applied to the liquid crystal layer 203 every pixel. A pixel gradation is determined in accordance with a potential (display pixel potential) of the pixel electrode 210 in a phase of application of the electric field. Thus, a vide signal is supplied from the signal line 209 for the purpose of giving the display pixel potential, and a predetermined potential of the video signal thus supplied is sampled by the transistor Tr.

As will be described later, the other electrode through which the electric field is applied to the liquid crystal layer 203 every pixel is formed on the side of the color filter substrate 201.

A second alignment film 212 is formed on the pixel electrode 210.

A plurality of functional films are laminated on the surface, on the liquid crystal layer 203 side, of the color filter substrate 201.

More specifically, the color filter substrate 201 is made of a material, such as a glass, having a high degree of transparency, and the color filter layer 220 is formed on the color filter substrate 201. The color filter layer 220 has a filter area 220A dyed with a predetermined color. With regard to the color of the filter area 220A, one pixel is designated with one color, and the color arrangement for the pixels is determined in accordance with a predetermined pattern. For example, the arrangement of the three colors of red (R), green (G) and blue (B) is set as one unit, and this color arrangement is repeated in a matrix.

In the transmission type liquid crystal display device 100 of the first embodiment, a black matrix BM is buried in the color filter layer portion between the filter areas.

A planarizing film 221 is formed on the color filter layer 220, and a common electrode 222 referred to as "a counter electrode" as well is formed on the planarizing film 221. The common electrode 222 is made of a transparent electrode material, and is formed as one sheet of blanket electrode common to a plurality of pixels, for example, all the pixels of an effective pixel area.

A first alignment film 223 is formed on the common electrode 222.

On the other hand, a protective layer 230 is formed on a back surface (on the display surface side) of the color filter substrate 201. The front surface of the protective layer 230 is the display surface 200A.

In the transmission type liquid crystal display device 100 of the first embodiment, a spacer 10 having a multiple step structure is formed below the first substrate (the color filter substrate 201). The spacer 10 is a member for regulating and holding a thickness of the liquid crystal layer 203 by forming a gap having a given thickness between the first substrate and the second substrate (the TFT array substrate 202). In general, it is required for the spacer that the spacer is not readily destroyed because of its mechanical strength has high elasticity, and the spacer has an insulating property.

In the spacer 10 in the transmission type liquid crystal display device 100 of the first embodiment, a spacer main body 10A having a relatively large cross-sectional area, and a subsidiary spacer 10B having a smaller cross-sectional area than that of the spacer main body 10A are made of the same material integrally with each other. As a result, a step 10s is formed in a boundary between the spacer main body 10A and the subsidiary spacer 10B.

It should be noted that as will be described in changes of the embodiments of the present invention, the spacer main body 10A and the subsidiary spacer 10B may be made of different materials, or a part (outline portion) of the spacer main body 10A may be made of the same material as that of the subsidiary spacer 10B.

Next, results of study about advantages obtained from the shape with regard to the spacer 10 having such a two-step structure will be described together with comparative example of the first embodiment.

Figure 3A:
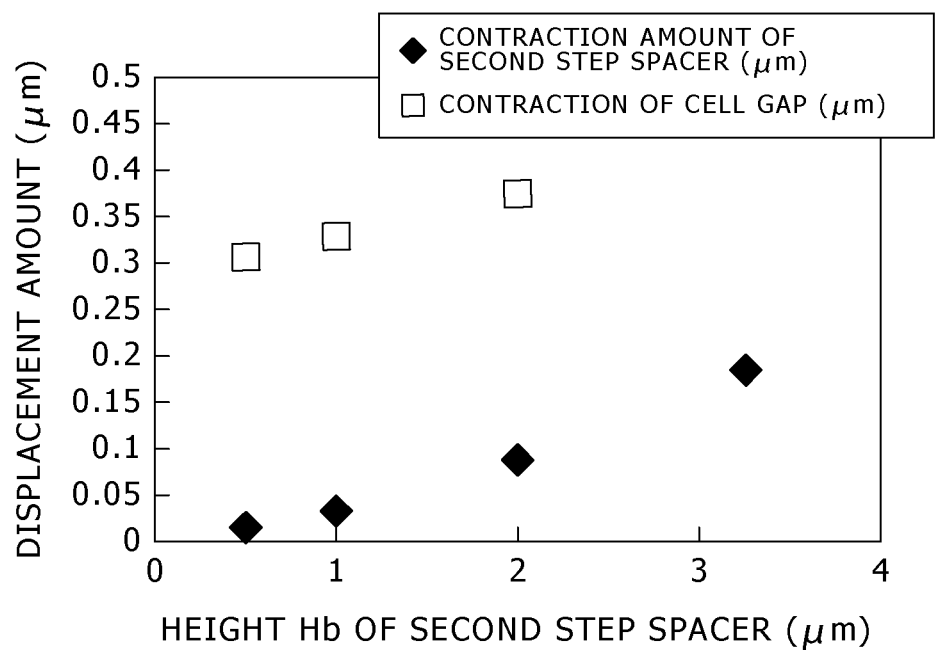
FIGS. 3A and 3B are respectively a graph showing a relationship between a height of a second step spacer portion, and a displacement amount in the transmission type liquid crystal display device of the first embodiment, and a schematic cross sectional view explaining definition of the height in the graph shown in FIG. 3A.

FIG. 3A is a graph explaining a relationship between a height of the second step subsidiary spacer 10B, and a displacement amount of substrate.

Figure 3B:
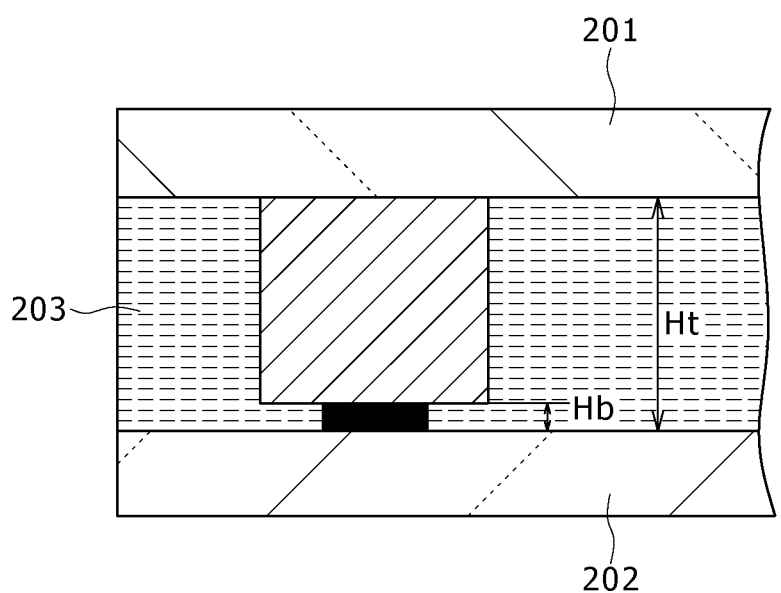

Here, "the height," as shown in FIG. 3B, means a size of the spacer 10 in a separate distance Ht between the color filter substrate 201 as "the first substrate," and the TFT array substrate 202 as "the second substrate."

There were prepared four kinds of samples in which heights Hb of the subsidiary spacer 10B were set as being 0.5, 1.0, 2.0, and 3.3 μm while the separate distance Ht was held constant. In the four kinds of samples, ratios in height between the spacer main bodies 10A and the subsidiary spacers 10B in the spacers 10 were different from one another.

Certain external pressures having the same magnitude were applied to the four kinds of samples in a direction vertical to the substrate. At this time, a contraction amount in the direction vertical to the substrate was measured based on the height of the cell gap having the separation distance Ht as an initial value, and the height of the subsidiary spacer 10B.

FIG. 3A shows a relationship between the contraction amounts (displacement amounts) in the two kinds of heights, and the height Hb of the subsidiary spacer 10B in the initial state free from the external pressure.

As apparent from the graph of FIG. 3A, the displacement amount of subsidiary spacer 10B, and the displacement amount of cell gap are approximately equal to each other. Thus, it is understood that from this that the subsidiary spacer 10B (second step) having the smaller cross-sectional area gets mainly crushed by application of the external pressure.

In addition, it is also understood from the graph of FIG. 3A that when the height Hb of the subsidiary spacer 10B is large, the displacement amount of subsidiary spacer 10B is large accordingly.

Moreover, it is also understood from the graph of FIG. 3A that the spacer 10 which has entirely the high strength is obtained as the height of the spacer main body 10A is higher, that is, the height of the subsidiary spacer 10B is smaller.

Comparative Example

FIG. 4 is a cross sectional view of a structure of comparative example of the first embodiment showing spacer shapes and dispositions for strengthening the cell strength. In FIG. 4, the same constituent elements as those in FIG. 1 are designated by the same reference numerals, respectively.

First spacers 90H with which the thickness of the liquid crystal layer 203 is determined, and second spacers 90L each having a height slightly lower than that of each of the first spacers 90H are disposed at a predetermined rate.

It is difficult to prevent the generation of the so-called low-temperature bubbles, and to ensure the strength (the strength against the surface pressing or the like) against the external force. Thus, such spacer shapes and disposition are devised for the purpose of dissolving this trade-off relationship. Hereinafter, the trade-off relationship will be described.

When an elastic force (a restoring force in a narrow sense) of a substrate is large in a phase of restitution from the substrate deformation, bubbles are generated in a liquid crystal layer because liquid crystal molecules are slow in motion at a low temperature, and thus fail to follow the substrate.

The low-temperature bubbles can be effectively prevented from being generated by weakening the restoring force of the substrate. Rigidity of the substrate itself depends on the substrate thickness, the material and the like which are determined depending on optical characteristics and other primary factors. Therefore, changing the rigidity of the substrate itself is not a parameter which can not be readily changed only for prevention of the generation of the low-temperature bubbles.

On the other hand, an occupancy of the spacers per unit area, that is, sizes of individual spacers when viewed from the display surface, and a disposition density of the spacers are largely related to the restoring force of the substrate. When the occupancy of the spacers per unit area is large, the cell gap hardly contracts by application of the external pressure. Therefore, from this standpoint, the larger occupancy of the spacers is preferable.

However, when the number of spacers is too large, a useless area for the pixel display increases to reduce a cell aperture ratio. Thus, from a viewpoint of effective utilization of the image display within the cells, there is also a limit to the size of the spacer, and the disposition density of the spacers.

In addition, when the occupancy of the spacers for unit area is too large, dangerousness of generation of the low-temperature bubbles increases because the restoring force of the substrate is large.

With the structure of comparative example shown in FIG. 4, when the substrate is bent by application of the external pressure, an end face of the short second spacer 90L contacts the substrate, thereby supporting the substrate. Therefore, in the case of the large external pressure, the strength having the necessary magnitude can be ensured.

On the other hand, when the external pressure is released, the restoring force of the substrate is determined depending on only a contact area of the first spacer 90H because the end face of the short second spacer 90L leaves the substrate. For this reason, when the occupancy of the contact area of the first spacers 90H is reduced to a certain extent, the generation of the low-temperature bubbles is prevented.

From the above, the structure of comparative example shown in FIG. 4 can be said as one of the structures with each of which the prevention of the generation of the low-temperature bubbles, and the stability of the gap and the securement of the cell strength are made compatible with each other.

However, the number of processes for the spacer formation in the structure of comparative example shown in FIG. 4 is required to be double the number of processes for the spacer formation in the case of only the first spacer 90H.

For this reason, when the process sharing is promoted, the heights of the second spacers 90L disperse because the controllability for the spacer heights is reduced.

In addition, although increasing the number of second spacers 90L results in strengthening the cell strength, the cell aperture ratio is reduced, which exerts an influence on the display ability (the brightness of the picture).

Now, it is also known that although when a large number of second spacers 90L are installed, the strength increases in a test for applying the external pressure to the cells such as a sliding test or a static load test, the first spacers 90H are slightly bent, which results in the gap nonuniformity.

On the other hand, when the area occupancy of the first spacers 90H is increased for preventing the strengthening of the initial strength, and the gap nonuniformity, the low-temperature bubbles are generated.

In the case of the structure of comparative example shown in FIG. 4, it is necessary to strictly control and optimize the size and area occupancy of the first spacers 90H, and the area occupancy of the second spacers 90L.

However, even when any of the size and area occupancy of the first spacers 90H, and the area occupancy of the second spacers 90L is changed, the design needs to be largely changed because the design needs to start from the pattern again. In addition, even when the strength is desired to be increased all the more because of the development of a limited model for an area of everlasting summer where the generation of the low-temperature bubbles does not become a problem, after all, the large design change is compelled to be made.

As has been described, with the structure of comparative example shown in FIG. 4, although it is possible to dissolve the trade-off relationship between the prevention of the generation of the low-temperature bubbles, and the strengthening of the strength, it is necessary to make the strict control. In addition thereto, the cell aperture ratio may become prey to the dissolution of the trade-off relationship. In addition, the optimization becomes difficult because the parameters operable for the dissolution of the trade-off relationship are accompanied by the large design change.

The spacer 10 having the multiple step structure in the first embodiment either dissolves or relaxes the trade-off relationship and the difficulty of the design change without sacrificing the cell aperture ratio.

In the spacer 10 illustrated in FIG. 1, the cross-sectional area of the subsidiary spacer 10B related to the generation of the low-temperature bubbles is determined depending on how to generate the low-temperature bubbles, and the cross-sectional area of other portion (the subsidiary spacer 10B) is increased, thereby ensuring the strength. In addition, even after such areal factors are determined, the height of the subsidiary spacer 10B is adjusted in the process, thereby making it possible to adjust the balance point between the strength and the prevention of the generation of the low-temperature bubbles even after completion of the design.

Moreover, even when the occupied area of one spacer 10 having the height of the cell gap needs to be made larger than that of the spacer 90H shown in FIG. 4 for the purpose of ensuring the strength, the area occupancy of the spacers can be entirely reduced because the short second spacer 90L is unnecessary. Therefore, the cell aperture ratio can be increased all the more.

It is noted that giving analogy from the results shown in FIG. 3A, when the external pressure is gradually increased, the spacer 10 gets crushed from the step having the large cross-sectional area. This also applies to the spacer having three or more step structure.

Therefore, in the first embodiment of the present invention, a difference in cross-sectional area among the steps in the multiple step structure, and a difference in height among the steps are variedly combined with each other, thereby making it possible to increase an optimal range for the dissolution of the trade-off relationship.

Manufacturing Method

FIGS. 5A to 5D respectively show cross sectional views of the color filter substrate 201 when the spacer 10 having the multiple step structure in the transmission type liquid crystal device of the first embodiment is manufactured.

Figure 5A:
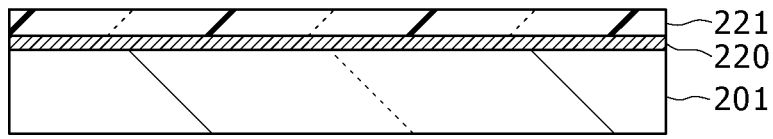
FIGS. 5A to 5D are cross sectional views showing processes for manufacturing a spacer in the transmission type liquid crystal display device of the first embodiment.

As shown in FIG. 5A, the color filter layer 220 is formed on the color filter substrate 201, and the planarizing film 221 is formed on the color filter layer 220.

Figure 5B:
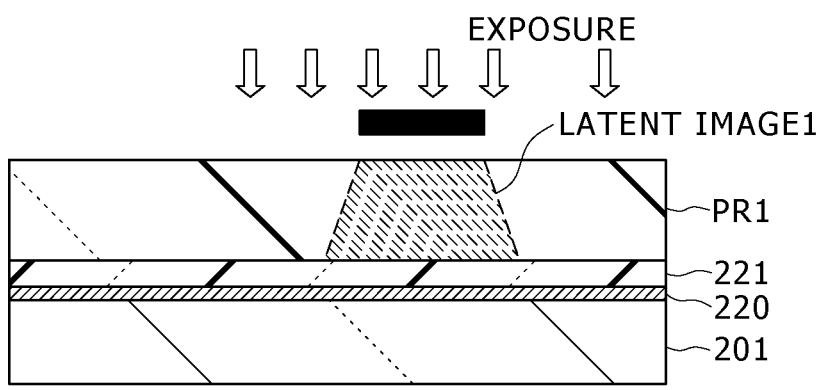

A positive resist PR1 is formed on the planarizing film 221 to have a predetermined thickness. Next, as shown in FIG. 5B, by using a photo mask for light-blocking a portion in which the spacer is intended to be formed of the positive resist PR1 thus formed, a positive resist portion in the periphery of the portion in which the spacer is intended to be formed is exposed. As a result, a latent image 1 corresponding to a light-blocking pattern of the photo mask is formed within the positive resist PR1. The latent image 1 corresponds to the first step (spacer main body) of the final spacer 1.

Figure 5C:
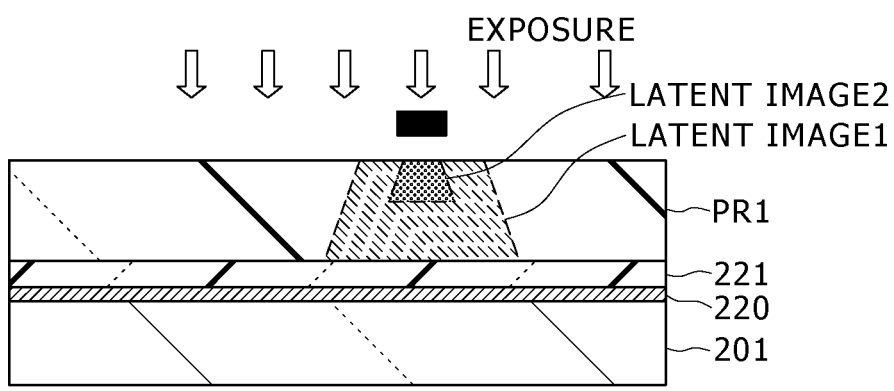

Subsequently, as shown in FIG. 5C, second round of an exposure (multiple exposure) is carried out by using a photo mask having a light-blocking pattern which is slightly smaller than the light-blocking area in a phase of the first round of the exposure shown in FIG. 5B. As a result, a latent image 2 is formed within the latent image 1 in the positive resist PR1.

Figure 5D:
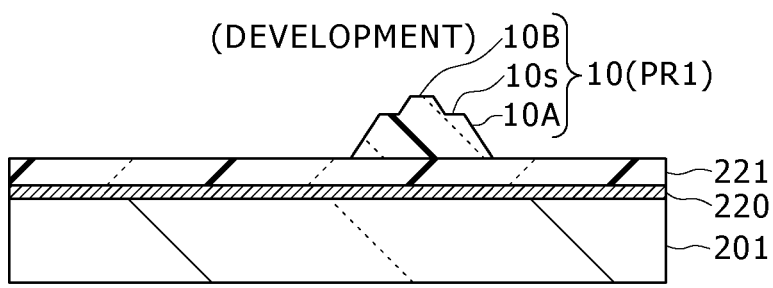

The latent image 1 corresponds to the second step (subsidiary spacer) of the final spacer 10. The latent image 1 hardly dissolves in a developer. Also, the latent image 2 more hardly dissolves in the developer than in the latent image 1. For this reason, after completion of the development, as shown in FIG. 5D, the spacer 10 having the spacer main body 10A and the subsidiary spacer 10B, and also having the step 10s in the external surface of the boundary portion between the spacer main body 10A and the subsidiary spacer 10B is formed, reflecting the overlapping situation of the latent image 1 and the latent image 2.

After that, the specially formed TFT array substrate 202 and the resulting color filter substrate 201 are stuck to each other, and the liquid crystal is enclosed within the cell gap. As a result, the liquid crystal layer 203 shown in FIG. 1 is formed.

Although the multiple exposures using the two sheets of photo masks are carried out in the spacer manufacturing method, only the positive resist PR1 is used as the material for the spacer 10. In addition, the spacer main body 10A and the subsidiary spacer 10B are formed integrally with each other. For this reason, the manufacturing process is relatively simple, and thus the cost is suppressed as much as possible.

Hereinafter, other manufacturing methods of each different from the first embodiment although being implemented on the premise of the structure shown in FIGS. 1 and 2 will be described as second and third embodiments, respectively.

Second Embodiment

FIGS. 6A to 6E respectively show cross sectional views of the color filter substrate 201 when the spacer 10 having the multiple step structure in a transmission type liquid crystal display device according to the second embodiment of the present invention is manufactured.

Figure 6A:
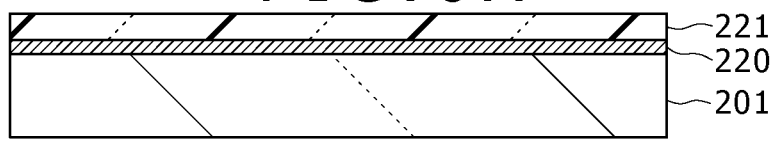
FIGS. 6A to 6E are cross sectional views showing processes for manufacturing a spacer in a transmission type liquid crystal display device according to a second embodiment of the present invention.

As shown in FIG. 6A, the color filter layer 220 is formed on the color filter substrate 201, and the planarizing film 221 is formed on the color filter layer 220.

Figure 6B:
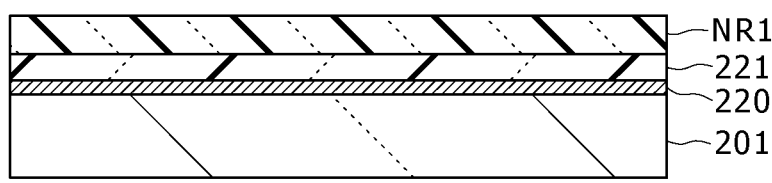

A first level negative resist NR1 is formed on the planarizing film 221 to have a predetermined thickness. Next, as shown in FIG. 6B, by using a photo mask for exposing a portion in which the spacer is intended to be formed of the negative resist NR1 thus formed, and light-blocking the periphery thereof, a negative resist NR portion of the portion in which the spacer is intended to be formed is exposed. As a result, a latent image corresponding to an opening pattern of the photo mask is formed within the negative resist NR1.

Figure 6C:
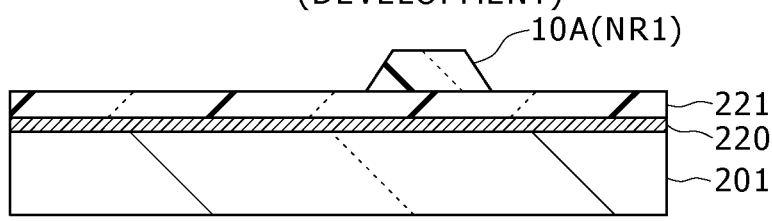

When the negative resist NR1 is developed, as shown in FIG. 6C, the latent image is visualized, and a first step (the spacer main body 10A) of the final spacer is approximately formed.

Figure 6D:
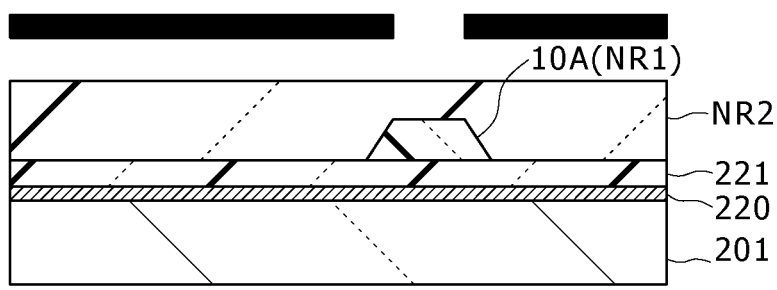

Subsequently, a second level negative resist NR2 is formed so as to cover the spacer main body 10A thus formed and so as to have a predetermined thickness from the upper surface of the spacer main body 10A. Also, as shown in FIG. 6D, second round of an exposure is carried out by using a photo mask having an opening pattern slightly smaller than the opening area in the phase of the first round of the exposure shown in FIG. 6B.

As a result, a latent image is formed above an upper portion of the spacer main body 10A in the negative resist NR2.

Figure 6E:
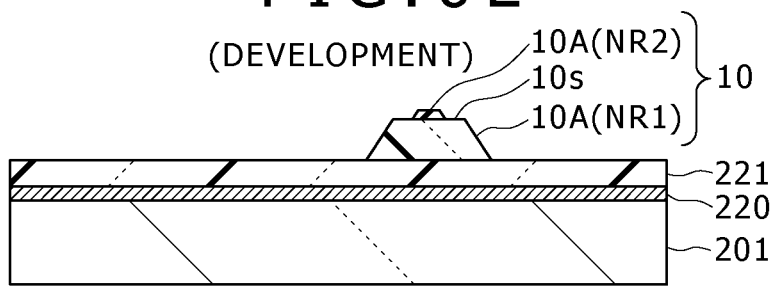

When the negative resist NR2 is developed, as shown in FIG. 6E, the latent image is visualized, so that a second step (the subsidiary spacer 10B) having the final spacer shape is formed on the spacer main body 10A (NR1). As a result, there is formed the spacer 10 having the spacer main body 10A and the subsidiary spacer 10B, and also having the step 10s on the external surface of the boundary portion between the spacer main body 10A and the subsidiary spacer 10B.

After that, the specially formed TFT array substrate 202 and the resulting color filter substrate 201 are stuck to each other, and the liquid crystal is enclosed within the cell gap. As a result, the liquid crystal layer 203 shown in FIG. 1 is formed.

In this spacer manufacturing method, the exposure is carried out twice by using the two sheets of photo masks, and thus the deposition and development of the two resists need to be individually carried out. For this reason, the manufacturing process is slightly complicated as compared with the case of the manufacturing method shown in FIGS. 5A to 5D.

However, the heights of the first and second steps can be controlled based on the thicknesses of the negative resists NR1 and NR2 in the phases of the deposition of the negative resists NR1 and NR2, respectively. Therefore, this spacer manufacturing method has an advantage that the controllability is superior to that in the manufacturing method, shown in FIGS. 5A to 5D, in which the height, especially, the position of the step depends on the conditions of the exposure and the development.

Third Embodiment

FIGS. 7A and 7E respectively show cross sectional views of the color filter substrate 201 when the spacer 10 having the multiple step structure in a transmission type liquid crystal display device according to the third embodiment of the present invention is manufactured.

As shown in FIG. 6A, the color filter layer 220 is formed on the color filter substrate 201, and the planarizing film 221 is formed on the color filter layer 220.

A first level positive resist PR3 is formed on the planarizing film 221 to have a predetermined thickness. Next, as shown in FIG. 7B, by using a photo mask for light-blocking a portion in which the spacer is intended to be formed of the positive resist PR3 thus formed, and exposing the periphery thereof, there is exposed the periphery of a positive resist PR3 portion of the portion in which the spacer is intended to be formed is exposed. As a result, a latent image corresponding to a light-blocking pattern of the photo mask is formed within the positive resist PR3.

When the positive resist PR3 is developed, as shown in FIG. 7C, the latent image is visualized, and a core portion 10c having a function as "a step adjusting layer having a height for regulating a step" is formed on the planarizing film 221.

Subsequently, a negative resist NR3 is formed so as to cover the core portion 10c thus formed, and so as to protrude from a planarizing surface by a height in correspondence to a head position of the core portion 10c. Also, as shown in FIG. 7D, second round of an exposure is carried out by using a photo mask having an opening pattern slightly smaller than the light-blocking area in the phase of the first round of the exposure shown in FIG. 7B.

As a result, there is formed a latent image of the negative resist NR3 which covers the periphery of the core portion 10c in the negative resist NR3. When the strength or the like of the exposure is adjusted, "a corner portion" shown in FIG. 7D is reflected in the latent image as well within the negative resist NR3, thereby molding the corner portion into the step.

When the negative resist NR3 is developed, as shown in FIG. 7E, the latent image is visualized, so that a cap portion 10p having a step 10s on its external surface is formed so as to cover the core portion 10c.

The core portion 10c and the cap portion 10p are both portion names given based on the cross-sectional shape and the materials. On the other hand, when viewing the outer shape, the spacer 10 is formed in the form of the twp step structure having the spacer main body 10A lying below the step 10s, and the subsidiary spacer 10B lying above the step 10s.

After that, the specially formed TFT array substrate 202 and the resulting color filter substrate 201 are stuck to each other, and the liquid crystal is enclosed within the cell gap. As a result, the liquid crystal layer 203 shown in FIG. 1 is formed.

It is noted that anisotropic etching may be carried out for the negative resist NR3 instead of carrying out the second round of the exposure. By carrying out the anisotropic etching, the corner in the phase of the deposition of the negative resist NR3 is reflected, thereby forming the step.

With the method of manufacturing the transmission type liquid crystal display device of the third embodiment, each of the deposition and exposure of the resist is carried out twice, and thus the number of processes is identical to that in the second embodiment. It is noted that the anisotropic etching can be substituted for one exposure.

In addition, the controllability is slightly inferior to that in the second embodiment because the position of the step is regulated by the latent image in which the resist corner in the phase of the exposure is reflected.

However, the multiple step portions can be more smoothly formed in terms of the outside shape than in the first embodiment. For this reason, it is possible to manufacture the transmission type liquid crystal display device having the strong cell strength.

In addition, as with various embodiments which will be described later, a formative portion into which the existing structure is formed so as to accompany the phase of formation can be diverted to an upper portion of the step, a lower portion of the step, or the core portion. For this reason, although it may be impossible to make the judgment from only the manufacture of the spacer, when the manufacture of the liquid crystal display panel is totally viewed, there is an advantage that the manufacturing process can be simplified.

Various structures and materials such as a cell gap adjusting layer, a signal line made of aluminum, a color resist, an insulating layer, and an electrode layer can be utilized as other structures and materials with which a part of the spacer 10 can be formed concurrently. In addition, for the height adjustment, a plurality of ones of these structures and materials can also be utilized in the form of being stacked on top of one another.

Some embodiments of transmission type, and reflection or semi-transmission type liquid crystal display devices each having a spacer structure allowing formation and processes of other structures to be moved to a common architecture in a phase of formation of a multiple step structure will be described hereinafter.

Fourth Embodiment

An embodiment of moving the processes which can be carried out by utilizing the manufacturing method shown in FIGS. 7A to 7E to a common architecture will be firstly described as a fourth embodiment of the transmission type liquid crystal display device in which liquid crystal molecules are vertically aligned by using vertical alignment protrusions (hereinafter referred to as "VAPs").

Figure 8A:
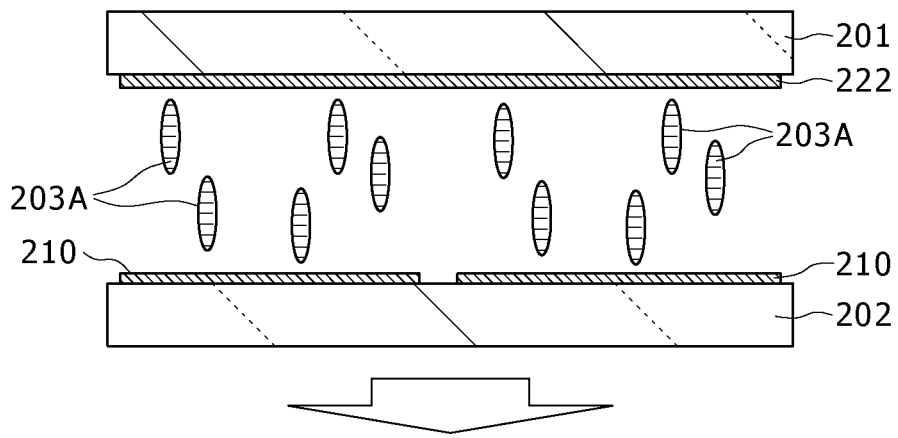
FIGS. 8A and 8B, and FIG. 8C are respectively schematic cross sectional views showing situations of liquid crystal molecules based on presence and absence of vertical alignment protrusions (VAPs) in a transmission type liquid crystal display device according to a fourth embodiment of the present invention, and a top plan view when viewing the periphery of the vertical alignment protrusion (VAP) from a plane direction.
Figure 8B:
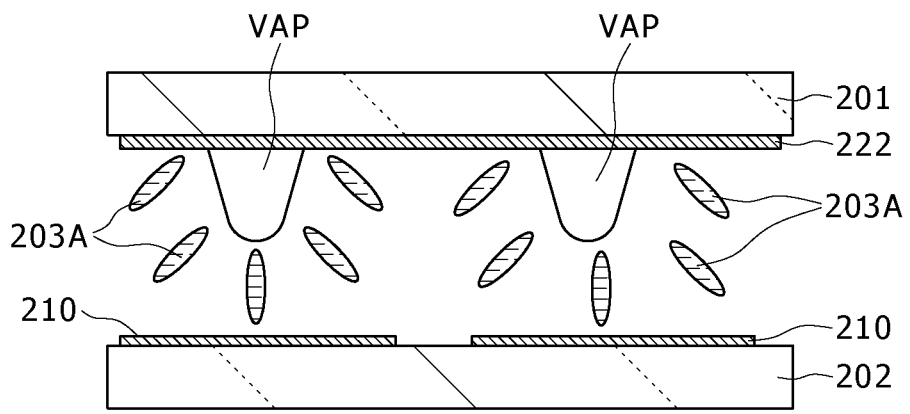
Figure 8C:
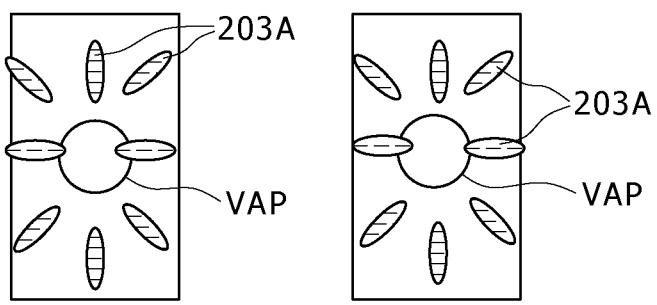

FIGS. 8A to 8C are respectively schematic cross sectional views explaining an operation of the vertical alignment protrusion (VAP). In FIGS. 8A to 8C, the same constituent elements as those in FIG. 1 are designated by the same reference numerals, respectively.

FIG. 8A schematically shows a molecular arrangement of a vertically-aligned (VA) liquid crystal when no vertical alignment protrusion (VAP) is provided. At this time, the liquid crystal molecules 203A are aligned approximately, vertically to the substrate.

For the purpose of improving both a response speed and a view angle of the vertically-aligned liquid crystal, the vertical alignment protrusions (VAPs) each protruding into the liquid crystal layer are formed in a certain degree of density, for example, on the color filter substrate 201 side. In this case, as shown in FIG. 8B, for the improvement involving a drawback in narrowness, the liquid crystal molecules 203A are aligned approximately, vertically to slope faces of the vertical alignment protrusions (VAPs). When the vertical alignment protrusion (VAP) is formed to have a shape of an approximately circular cone or an approximately circular truncated cone having an oblique slop face in 360°, as shown in FIG. 8C, the liquid crystal molecules 203A can be radially aligned in all directions. At this time, since the liquid crystal molecules 203A have the various alignment angles, the view angle and the response speed are both improved.

Figure 9:
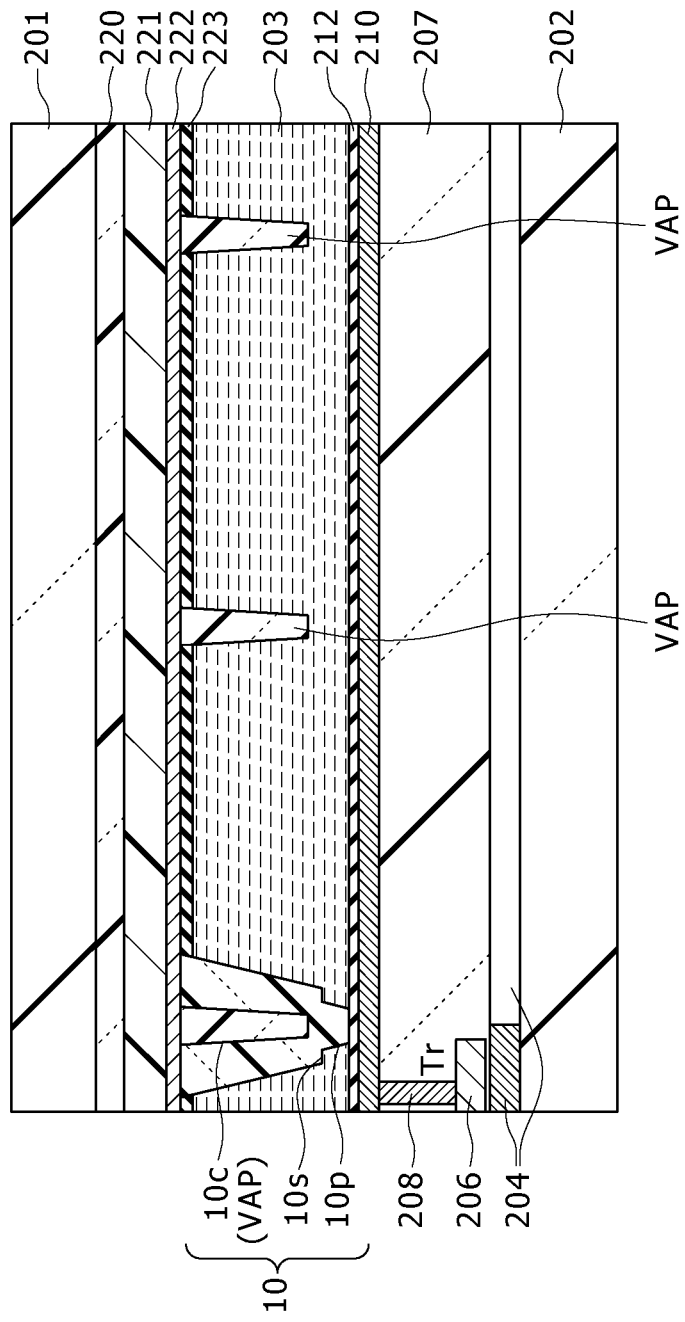
FIG. 9 is a schematic cross sectional view showing a structure of a transmission type liquid crystal display device according to the fourth embodiment of the present invention.

FIG. 9 shows a schematic cross sectional view of the transmission type liquid crystal display device according to the fourth embodiment of the present invention in which the spacer 10 having the shape shown in FIG. 7E is disposed in a VA liquid crystal display device having the vertical alignment protrusions (VAPs).

In FIG. 9, the same constituent elements as those shown in FIG. 1 are designated by the same reference numerals, respectively.

In the spacer 10 shown in FIG. 9, the core portion 10c is formed concurrently with formation of each of the vertical alignment protrusions (VAPs). Normally, a novolac system positive resist is applied and is developed after completion of the exposure, thereby forming the vertical alignment protrusion (VAP). At this time, the core portion 10c is formed concurrently with the formation of the vertical alignment protrusion (VAP) in the portion as well in which the spacer is intended to be formed. The size of the core portion 10c is determined on the pattern of the photo mask, and thus can be set arbitrarily from the vertical alignment protrusions (VAPs).

After that, similarly to the processes shown in FIGS. 7A to 7E, a column (the spacer 10) having a multiple step structure is formed through, for example, the application and exposure (or the anisotropic etching) of the negative resist.

Alternatively, unlike the processes in FIG. 9, processes may also be adopted such that the core portion 10c is formed only in the portion in which the spacer is intended to be formed, and the novolac system positive resist is applied, exposed and developed, thereby simultaneously forming the cap portion 10p and the vertical alignment protrusion (VAP).

In the fourth embodiment, a part of the spacer 10 is simultaneously formed when the vertical alignment protrusion (VAP) is formed as the existing structure. Therefore, the cost can be reduced all the more because the number of processes only for pure formation of the spacer is less.

Fifth Embodiment

Figure 10:
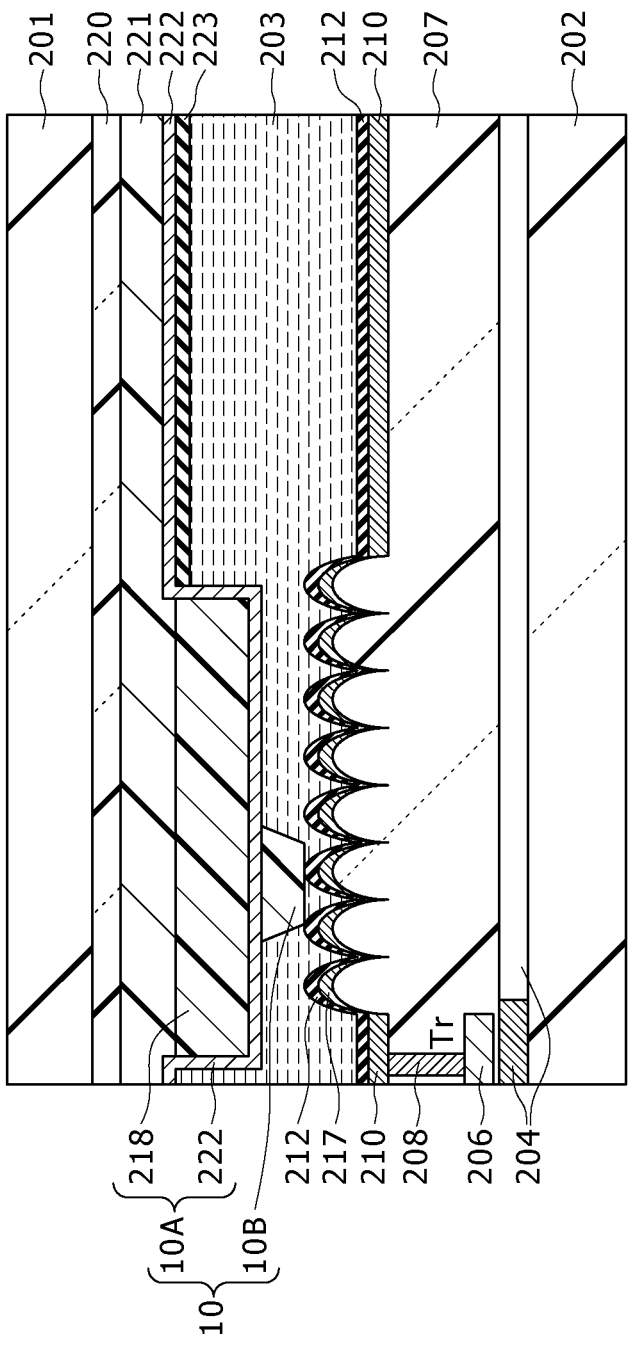
FIG. 10 is a schematic cross sectional view showing a structure of a reflection or semi-transmission type liquid crystal display device according to a fifth embodiment of the present invention.

FIG. 10 is a schematic cross sectional view showing a structure of a reflection or semi-transmission type liquid crystal display device according to a fifth embodiment of the present invention. In FIG. 10, the same constituent elements as those in FIG. 1 are designated by the same reference numerals, respectively.

In the reflection or semi-transmission type liquid crystal display device illustrated in FIG. 10, irregularities are formed on a part of the multi-layer insulating film 207 on the TFT array substrate 202 side, and a reflecting electrode 217 as a reflecting plate is formed on the irregularities. On the other hand, the pixel electrode 210 which is driven by the transistor Tr is disposed in other area of the pixel. The second alignment film 212 is formed on the surfaces of the pixel electrode 210 and the reflecting electrode 217.

On the other hand, a gap adjusting layer 218, made of an insulating material or the like, for adjusting the cell gap by its height to optimize a reflection optical path length of a light is formed on the planarizing film 221 on the color filter substrate 201 side facing the reflecting electrode 217. In addition, the common electrode 222 is disposed over approximately the entire surface of the pixel so as to cover an upper surface (a lower surface in the figure) and a side surface of the gap adjusting layer 218.

In the fifth embodiment, a step formed by the gap adjusting layer 218 and the common electrode 222 is utilized as the spacer main body 10A of the spacer 10. The strength of the spacer 10 can be sufficiently ensured because the areas of the gap adjusting layer 218 and the common electrode 222 are both relatively large.

Also, the subsidiary spacer 10B is formed on the common electrode 222 (downward in the figure) by utilizing a part of the portion for reflecting the light.

As a result, the spacer 10 is formed by utilizing a part of the existing structure for a part (the spacer main body 10A) of the spacer 10. For this reason, the reflection or semi-transmission type liquid crystal display device can be manufactured at the low cost all the more because the number of processes for the pure formation of the spacer is reduced.

It is noted that in this case, a height of one step of the subsidiary spacer 10B is made equal to a thickness of the liquid crystal layer 203 in the reflecting portion. However, the spacer 10 having two or more steps, as shown in FIG. 1, may be formed in the reflecting portion having the thickness equal to that of the liquid crystal layer 203.

In addition, although not especially illustrated, for example, a metallic layer having a thickness such as aluminum (Al) used for the signal line may be given as any other suitable structure utilized as the spacer main body 10A. In addition, even so, when the height is lacking, the metallic layer, the planarizing film, and any other suitable insulating layer can be stacked on top of one another to be used in the spacer main body 10A.

In addition, although not especially illustrated, the spacer 10 may be formed on the reflecting electrode 217 having the irregularities formed on its surface. At this time, it is possible to suitably use a manufacturing method similar to the manufacturing method shown in FIGS. 7A to 7E.

Figure 11A:
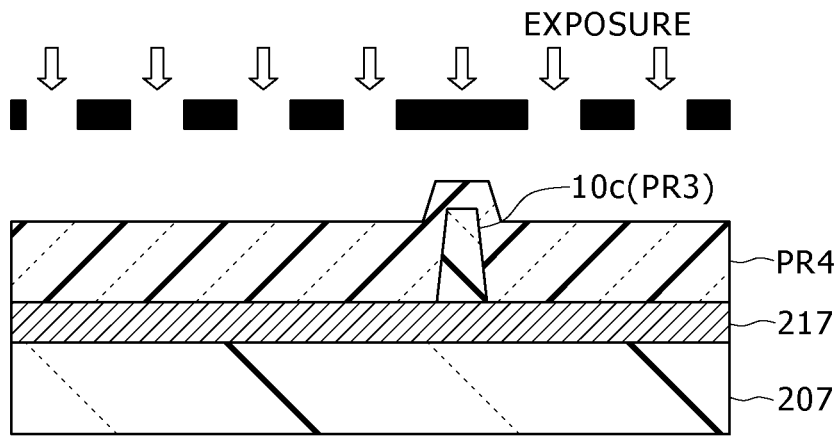
FIGS. 11A to 11C are schematic cross sectional views showing processes in a method of simultaneously processing a reflecting electrode and a spacer in the reflection or semi-transmission type liquid crystal display device of the fifth embodiment.
Figure 11B:
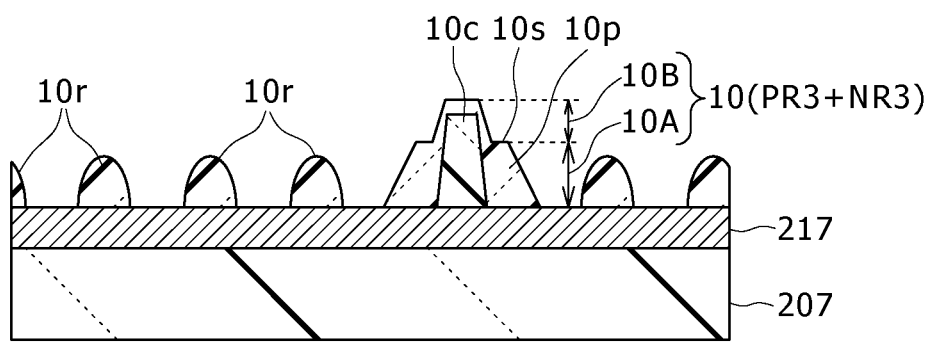
Figure 11C:
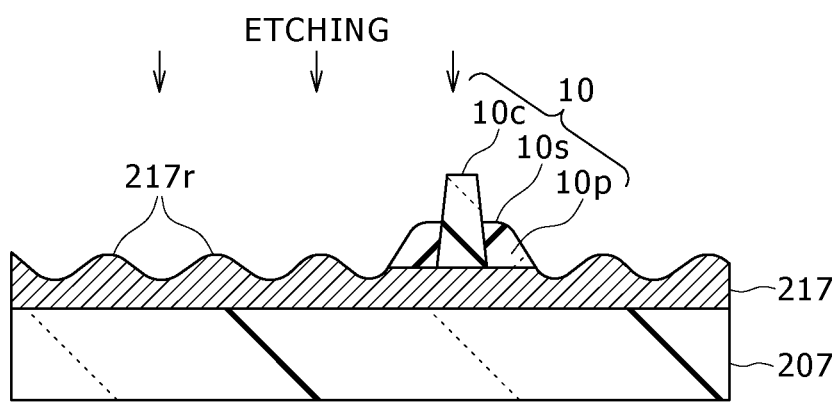

FIGS. 11A to 11C are respectively schematic cross sectional views explaining a method of simultaneously forming the reflecting electrode 217 having the irregularities formed on its surface, and the spacer 10.

By utilizing the same manufacturing processes as those shown in FIGS. 7A to 7D, the core portion 10c made of the positive resist PR3 is formed through the patterning, and a resist for the cap portion 10p covering the core portion 10c is deposited. Although the resist for the cap portion 10p is the negative resist NR3 in the process shown in FIG. 7D, a positive resist PR4 is used as the resist for the cap portion 10p in the process shown in FIG. 11A. In addition, although the two-level resist structure is formed on the planarizing film 221 on the color filter substrate 201 side in the process shown in FIG. 7D, the two-level resist structure is formed on the conductive film becoming the reflecting electrode 217 on the TFT array substrate 202 side in the process shown in FIG. 11A.

Moreover, although in the second round of the exposure shown in FIG. 7D, the core portion 10c and its periphery are opened by using the mask, the portion corresponding to the core portion 10c and its periphery is light-blocked in the process shown in FIG. 11A. Moreover, a mask used in the process shown in FIG. 11A has numerous dot-like opening holes.

Therefore, after completion of the exposure and the development, as shown in FIG. 11B, a dot pattern 10r of the positive resist PR4 for the numerous irregularities of the reflecting electrode 217 is formed in a portion in which the reflecting electrode 217 is intended to be formed in the periphery of the spacer 10.

When the surface layer of the reflecting electrode 217 as the base is etched in a state in which the dot pattern 10r of the positive resist PR4 is formed, the numerous irregularities 217r are formed in the surface of the reflecting electrode 217 in the process in which the dot pattern 10r of the positive resist PR4 is etch-backed.

On the other hand, although the spacer 10 is also deformed, when this deformation is desired to be prevented, it is better that after a protective layer is formed on the spacer 10, the surface layer of the reflecting electrode 217 is etched.

In the manner as described above, when the manufacturing method shown in FIGS. 7A to 7E is applied to the processing for the reflecting electrode 217, similarly to the case where the transmission type liquid crystal device has the vertical alignment protrusions (VAPs) described above as shown in FIG. 9, the protrusions are formed from the resist for formation of the irregularities in the reflecting plate, and at the same time, the spacer is formed, thereby making it possible to manufacture the multiple step structure.

In addition, the reflecting electrode 217 as the base may be made of Al or the like of which the signal line is made as long as the conductive material has certain degree of a thickness. Thus, the reflecting electrode 217 and the signal line can be shared with each other. That is to say, the reflecting electrode 217 may also be used as the signal line, or may also be used independently of the signal line. When the reflecting electrode 217 and the signal line are shared with each other, there is no increase in burden imposed on the process due to the provision of the reflecting electrode 217.

Sixth Embodiment

FIG. 12A, and FIGS. 12B to 12D respectively show a schematic cross sectional view of a transmission type liquid crystal display device according to a sixth embodiment of the present invention, and schematic cross sectional views of changes of the transmission type liquid crystal display device of the sixth embodiment.

The spacer 10 shown in each of FIG. 12A, and FIGS. 12B to 12D is different from the spacer 10 shown in FIG. 1 in that the subsidiary spacer 10B of the spacer 10 is formed by utilizing the step on the TFT array substrate 202 side.

More specifically, in FIG. 12A, recess portions, and protrusions 207A protruding from bottom surfaces of the respective recess portions are formed in the multi-layer insulating film 207. The pixel electrode 210(B) is disposed on those recess portions, and the protrusions 207A protruding from the bottom surfaces of the respective recess portions. At this time, a step is also formed in the surface of the pixel electrode 210(B) in reflection of the shape of the base.

In the spacer 10 shown in FIG. 12A, the subsidiary spacer 10B is composed of the protrusions 207A, and the pixel electrode 210 portion covering the protrusions 207A. On the other hand, the spacer main body 10A is formed to be compatible in height to the gap of the liquid crystal layer 203. The shape of the spacer main body 10A follows the existing spacer shape. However, the TFT array substrate 202 side is processed, which results in that a contact area with the TFT array substrate 202 is sufficiently made smaller than the cross-sectional area of the spacer main body 10A, thereby effectively preventing the generation of the low-temperature bubbles.

When the subsidiary spacer 10B may be comparable in height to the thickness of the electrode, as shown in FIG. 12B, a portion, of the same metallic material as that of the pixel electrode 210(B), which is separated in the phase of the patterning can be utilized as the subsidiary spacer 10B.

In the specification of the present invention, "the first substrate" and "the second substrate" may be replaced with each other.

FIGS. 12C and 12D respectively show changes of the sixth embodiment in which the subsidiary spacer 10B is formed on the color filter substrate 201 side.

Since each of the substrates of changes of the sixth embodiment shown in FIGS. 12C and 12D can be analogized from the description given with reference to FIGS. 12A and 12B except that the electrode is the common electrode 222, a description thereof is omitted here for the sake of simplicity.

As has been described, a part of the spacer 10 can be formed even by the patterning or the like of the insulating layer or the pixel electrode. By devising the layout of the pixel electrode, the area of the pixel electrode which the spacer overlaps may also be controlled in the phase of the formation of the part of the spacer. Or, a structure may also be adopted such that the subsidiary spacer 10B made of the electrode material is formed concurrently with the patterning of the pixel electrode, and also the subsidiary spacer 10B is set in an electrically floating state to function as a part of the multiple step structure.

In addition thereto, similarly, the step by the color filter, the black matrix or the like may also be utilized.

Seventh Embodiment

In each of the spacers having the respective multiple step structures shown in FIG. 12A, and FIGS. 12B to 12D, the structure on the color filter substrate 201 side, and the structure on the TFT array substrate 202 side are merged into one spacer 10.

As apparent from the sixth embodiment, and changes thereof, the entire multiple step structure needs not to be necessarily formed on one substrate side. In addition, the cross-sectional area of each of the steps in the multiple step structure needs not to be necessarily, gradually increased from one substrate side to the other substrate side.

The formation of the spacer 10 through the merge described above is summarized in FIGS. 13A to 13D.

Figure 13A:
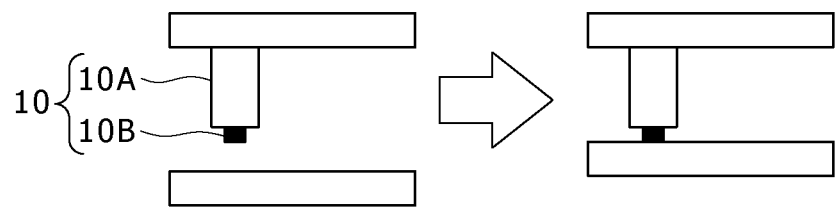
FIGS. 13A to 13D are schematic views showing forms of spacers, each in a transmission type liquid crystal display device according to a seventh embodiment of the present invention, each formed through merge of a spacer main body and a subsidiary spacer.

With each of the main formation methods for the spacer 10 until now, as shown in FIG. 13A, all the steps are formed on one side substrate. Also, when one side substrate and the other side substrate are stuck to each other, the coupling structure of the two sheets of substrates through the spacer 10 is completed through the black contact step.

Figure 13B:
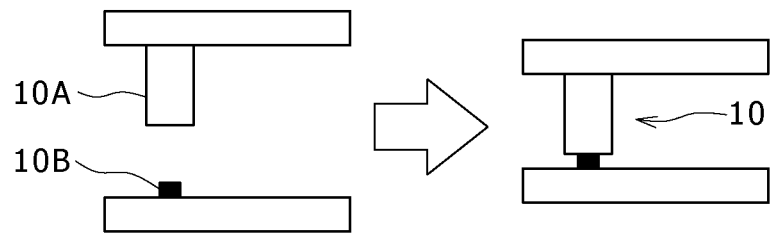

On the other hand, in FIG. 13B, the spacer main body 10A formed on one substrate, and the subsidiary spacer 10B formed on the other substrate are merged when the one substrate and the other substrate are stuck to each other.

Figure 13C:
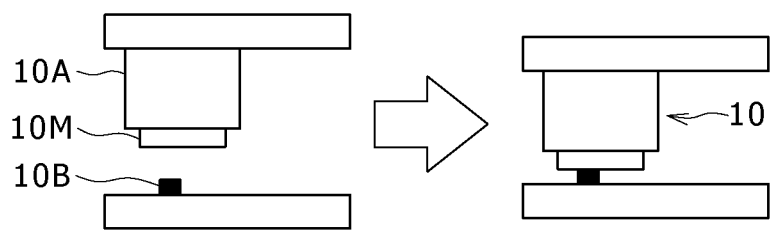
Figure 13D:
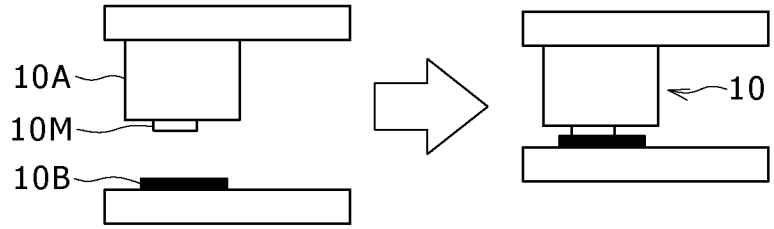

In addition, as shown in FIGS. 13C and 13D, in the case of a three step structure, it is arbitrarily set that which of the steps is formed on which of the substrates.

In addition, especially, as shown in FIG. 13D, the cross-sectional area of the subsidiary spacer 10B may be larger than that of a middle step 10M. That is to say, the cross-sectional area of the subsidiary spacer 10B may be arbitrarily set unless it exceeds the cross-sectional area of the spacer main body 10A. The reason for this is because although the steps get crushed in order from the step of the spacer having the small cross-sectional area, and having the large height by application of the external force, the restoring force of the substrate causing the generation of the low-temperature bubbles is determined in the weakest coupling portion. Therefore, since the middle step 10M operates to weaken the coupling force, there is offered an effect that the low-temperature bubbles are prevented from being generated even when the contact area of the subsidiary spacer 10B is large.

Thus, the method in which a part of the steps of the multiple step structure is formed on the TFT array substrate 202 side, and the remaining step(s) is(are) formed on the color filter substrate 201 side, and the multiple step structure is completed when the TFT array substrate 202 and the color filter substrate 201 are stuck to each other is variously adopted.

With regard to which of the structures is adopted, the structure in which the degree of freedom of the process, and the controllability for the height can be obtained to the desired extent may be suitably selected in consideration of the materials and characteristics (mechanical and electrical characteristics) of the steps.

In addition, in the case of the formation method shown in FIG. 13A of forming the multiple step structure on one side substrate, although the number of processes is generally increased and the satisfactory controllability is obtained, the productivity becomes worse. Allocation of a part of the spacer 10 to the two sheets of substrates is advantageous to the reduction of the number of entire processes, and the improvement in the productivity because of the enhancement of the commonality of the processes. For example, when a part of the spacer 10 is allocated to the two sheets of substrates, the possibility that the part can be formed in a position where the step is previously formed, or the existing structure can be utilized increases.

Eighth Embodiment

The spacer 10 having the multiple step structure which can be manufactured as the various forms as described above can also be used as a touch electrode structure as well in a so-called contact resistance type touch sensor.

An eighth embodiment relates to a spacer serving as such a touch electrode as well.

Figure 14A:
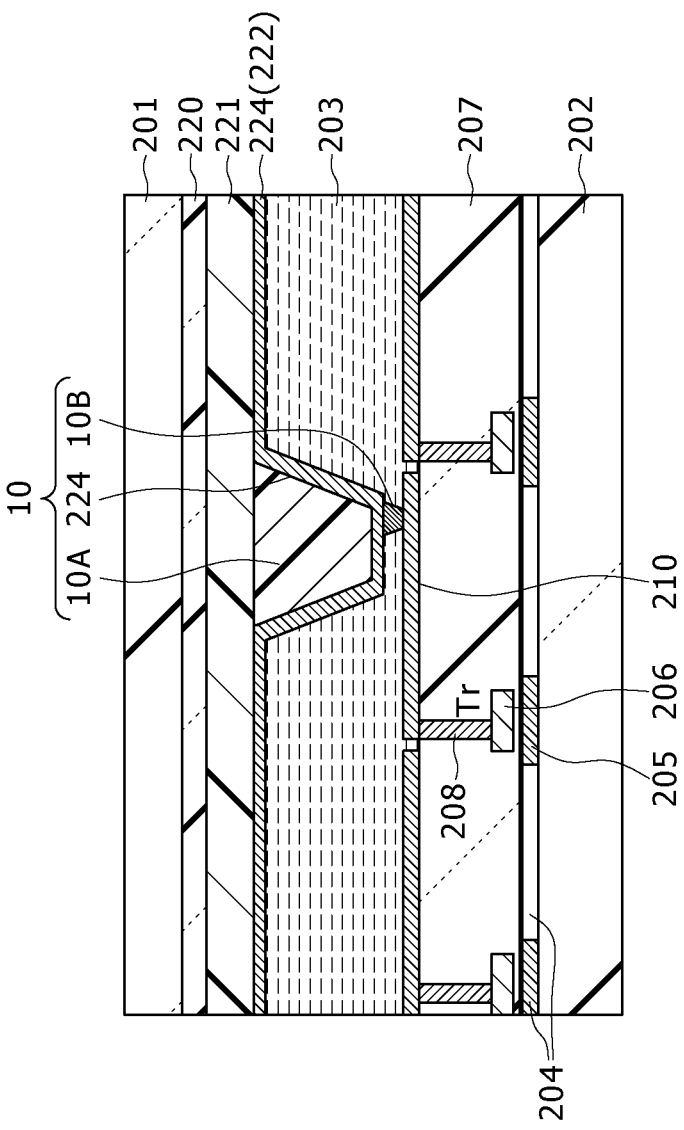
FIGS. 14A and 14B are respectively a schematic cross sectional view showing a structure of a transmission type liquid crystal display device according to an eighth embodiment of the present invention, and a partially enlarged view in a phase of electrode contact by application of an external pressure.

FIG. 14A is a schematic cross sectional view showing a structure of a transmission type liquid crystal display device with a touch sensor according to the eighth embodiment of the present invention.

The spacer 10 serving as the touch electrode as well has the spacer main body 10A, and a sensor electrode 224. In this case, the sensor electrode 224 is formed so as to be stranded on the spacer main body 10A of the color filter substrate 201. The sensor electrode 224 serves as the common electrode 222 as well. Moreover, the spacer 10 has the subsidiary spacer 10B made of an insulator on the sensor electrode 224 on a protrusion end face side of the spacer main body 10A. In a state in which as shown in FIG. 14A, no external pressure is applied to the subsidiary spacer 10B, the subsidiary spacer 10B functions as "a contact preventing insulating layer" for preventing contact between the pixel electrode 210 on the TFT array substrate 202 side, and the sensor electrode portion on the protrusion end face of the spacer main body 10A.

Figure 14B:
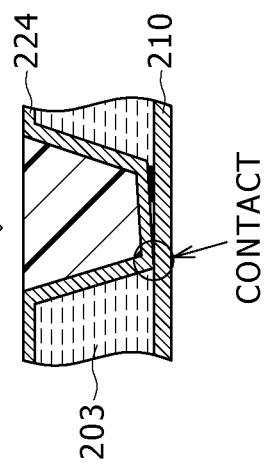

However, since the subsidiary spacer 10B has a relatively small thickness, and has an area smaller than that of the spacer main body 10A, the subsidiary spacer 10B is readily deformed when the external pressure is applied thereto as shown in FIG. 14B. As a result, the sensor electrode 224 and the pixel electrode 210 contact each other in a part of the spacer main body 10A having the large area. Electrical detection of this contact makes the touch detection possible. The spacer 10 serving as the touch electrode as well is provided either every pixel or every predetermined number of pixels.

Figure 15:
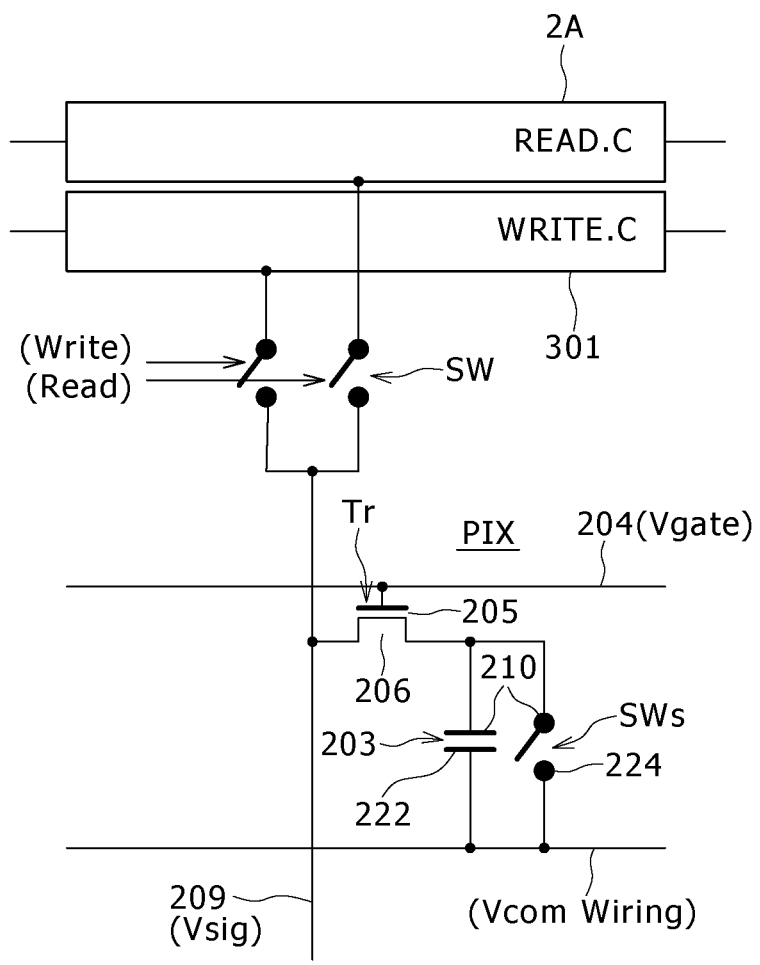
FIG. 15 is a circuit diagram, partly in block, showing an equivalent circuit of a pixel in the eighth embodiment shown in FIG. 14A together with a circuit for touch detection, and a circuit for data write.

FIG. 15 shows an equivalent circuit of the pixel together with a circuit for touch detection, and a circuit for data write.

In the equivalent circuit of the pixel PIX illustrated in FIG. 15, the constituent element which have already been described with reference to FIG. 1, and FIGS. 14A and 14B are designated by the same reference numerals, respectively.

Here, one electrode of a capacitor having the liquid crystal layer 203 as a capacitor dielectric is formed by the pixel electrode 210, and the other electrode thereof is formed by the common electrode 222.

A sensor switch SWs is formed in parallel with the capacitor in the equivalent circuit. The sensor switch SWs is a two-terminal switch having no control terminal. The sensor switch SWs is turned ON when the display surface 200 is externally pressed with a finger or the like, and returns back to an OFF state when the pressure is released. One electrode of the sensor switch SWs is formed by the pixel electrode 210, and the other electrode thereof is formed by the sensor electrode 224.

One of the source terminal and the drain terminal of the transistor Tr is connected to the pixel electrode 210, and the other of the source terminal and the drain terminal thereof is connected to the signal line 209.

The gate terminal of the transistor Tr is connected to the gate electrode 204. a gate voltage Vgate is supplied from a scanning circuit such as a vertical driver (not shown) to the gate terminal of the transistor Tr through the gate electrode 204. The transistor Tr is controlled in accordance with the potential of the gate voltage Vgate.

Each of the common electrode 222 and the sensor electrode 224 is connected to the supply line (Vcom wiring) for the common voltage Vcom.

A write circuit (WRITE.C) 301 is normally, directly connected as one constituent circuit within a drive portion to the signal line 209.

In the eighth embodiment, the signal line 209 is provided with a read circuit (READ.C) 2A together with the write circuit 301. Although the read circuit 2A and the write circuit 301 may be controlled in connection thereof by a switch SW which differentially operates (this means that "a read side and a write side of the switch SW are not simultaneously turned ON"), the switch SW may not be provided. The reason for this is because when the pressing of the switch is allowed for a user, a predetermined picture representing what instruction (meaning) the pressing of the switch corresponds to is displayed on the screen in accordance with the running application software, and a display time period is long to a certain extent. Also, the reason for this is because even when the screen is pressed during the display based on the data temporarily written, so that the sensor switch SWs is turned ON to fix the potential of the signal line 209, for example, to the common voltage Vcom, the same picture display state is obtained as soon as the pressing is released, and thus the picture display automatically returns back to the state before the pressing. This is the reason that the switch SW may not be provided.

FIGS. 16A to 16E respectively show waveform charts of pulses applied in the phase of the contact detection, and voltages of the signal lines and the like. The contact detection shown in FIGS. 16A to 16E is an example of the case where as shown in FIG. 15, the switch SW is controlled in accordance with a working control signal. FIG. 16A is a waveform chart of the gate voltage Vgate of the transistor Tr. FIG. 16B is a waveform chart of the signal voltage Vsig of the signal line 209. FIG. 16C is a waveform chart of the common voltage Vcom. FIG. 16D is a waveform chart of a control signal (Write) applied to the write side of the switch SW. Also, FIG. 16E is a waveform chart of a control signal (Read) applied to the read side of the switch SW. Hereinafter, the control signal (Write) will be called "the write signal (Write)," and the control signal (Read) will be called "the read signal (Read)."

Before time T1 (in an initial state), the gate voltage Vgate, the signal voltage Vsig and the common voltage Vcom, and the write signal (Write) and the read signal (Read) are all at the low level.

At the time T1, as shown in FIG. 16D, the write signal (Write) becomes a high level, and the signal voltage Vsig is supplied to the signal line 209 by the write circuit 301 shown in FIG. 15.

At time T2, as shown in FIG. 16A, the gate voltage Vgate is activated at the high level. At this time, or before the time T2, as shown in FIG. 16D, the write signal (Write) becomes the low level. For this reason, the write side of the switch SW is closed, so that the signal line 209 becomes a floating state. For this reason, when the gate voltage Vgate becomes the high level at the time T2 to turn ON the transistor Tr, a discharge path for the electric charges corresponding to the signal voltage Vsig is formed.

It is assumed that at the time point of the time T2, the touch sensor is in an ON state, that is, the pixel electrode 210 contacts the sensor electrode 224 as shown in FIG. 14B. In this case, since the electric charges of the signal line 209 in the floating state are discharged to the Vcom wiring having a very large capacitance, as indicated in FIG. 16B by a solid line, the signal voltage Vsig is largely reduced.

On the other hand, in the case where the touch sensor is in an OFF state at the time T2, even when an amount of electric charges of the signal line 209 is reduced, the amount of electric charges of the signal line 209 is used to charge only the capacitor of the relatively small pixel electrode 210 or the like. For this reason, as indicated in FIG. 16B by a broken line, the signal voltage Vsig hardly changes.

As described above, the potential of the signal voltage Vsig which largely changes between the ON state and OFF state of the touch sensor is detected at a timing of time T3 at which the sufficient potential change is expected. Specifically, at the time T3, as shown in FIG. 16E, the read signal (Read) is activated, thereby connecting the signal line 209 to the read circuit 2A shown in FIG. 15. A detecting circuit such as a sense amplifier is built in the read circuit 2A, and detects whether or not the potential of the signal line 209 is larger than a reference potential. Also, the detecting circuit determines "sensor OFF" when the potential of the signal line 209 is larger than the reference potential, and determines "sensor ON" when the potential of the signal line 209 is smaller than the reference potential.

It should be noted that the reference potential may be changed to check the potential of the signal line 209 step by step, thereby detecting the contact state of the touch sensor in more detail. In addition, contact time or the like may be detected.

After that, the read signal (Read) is set in the OFF state (returned back to a non-activation level), and the write signal (Write) is set in the ON state (activated) again to charge the signal line 209 with the electricity. At and after this time, the normal display can be carried out. After that, the common voltage Vcom is inverted, and the display control is continued.

It should be noted that this sensor technique is merely an example, and thus any other suitable technique other than this sensor technique may also be adopted.

Although the high elasticity, the insulating property and the like are required for the touch sensor electrode structure, adoption of the multiple step structure increases the degree of freedom thereof.

In addition, normally, the subsidiary spacer 10B made of an insulator is formed so as not to cause the short-circuit between the color filter substrate 201 and the TFT array substrate 202. Although the subsidiary spacer 10B is made of a material having high elasticity and a high insulating property, the subsidiary spacer 10B is crushed by an intentional external pressure because its height and area are relatively small, so that the contact between the color filter substrate 201 and the TFT array substrate 202 is caused in the wide step portion. In addition, even when the pressing force is too strong during the touch detection, the spacer main body 10A is hardly deformed any more because the strength of the spacer main body 10A is enough. Therefore, such a spacer 10 functions as the touch sensor as well as the spacer for preventing the substrate deformation, and moreover the low-temperature bubbles are effectively prevented from being generated because the area of the subsidiary spacer 10B is small.

Change 1

Figure 17A:
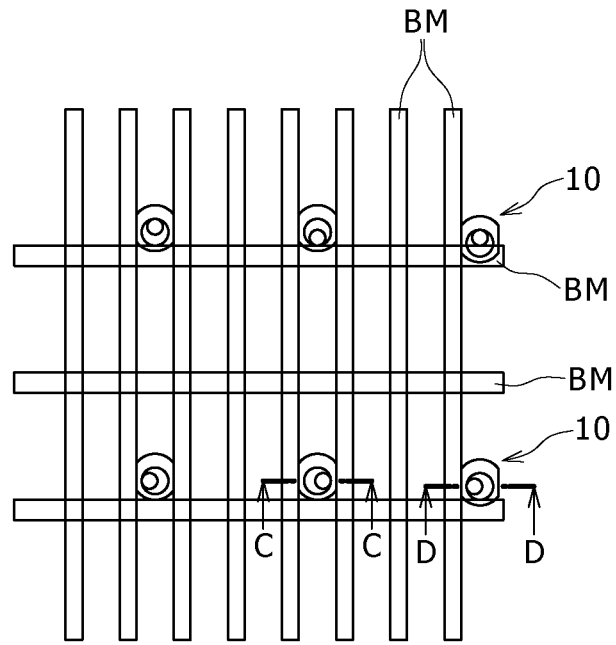
FIG. 17A, and FIGS. 17B and 17C are respectively a top plan view showing a structure of change 1, and schematic cross sectional views showing structures of partially enlarged spacers.
Figure 17B:
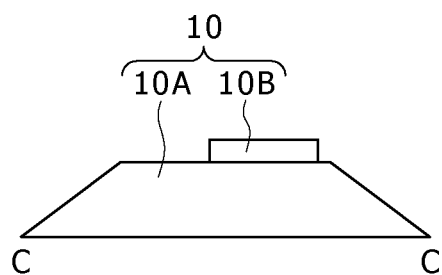
Figure 17C:
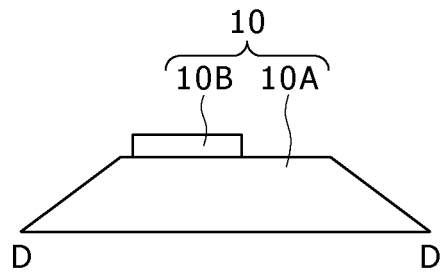

The subsidiary spacer 10B needs not to be necessarily located at the center of the protrusion end face of the spacer main body 10A. That is to say, several kinds of spacers having the subsidiary spacers 10B symmetrically disposed as shown in FIGS. 17B and 17C may be repeatedly disposed. Referring to FIG. 17A, vertically unevenly distributed alternate dispersion, and horizontally unevenly distributed alternate dispersion are repeated every other line.

This configuration is preferable that it is less likely to be fragile in a particular direction even if it receives force from diverse directions.

Change 2

Although in each of FIG. 2, and FIGS. 17A to 17C, the cross-sectional shape of the spacer 10 is a shape close to a circle such as an octagon shape, the embodiments of the present invention are by no means limited thereto.

Figure 18A:
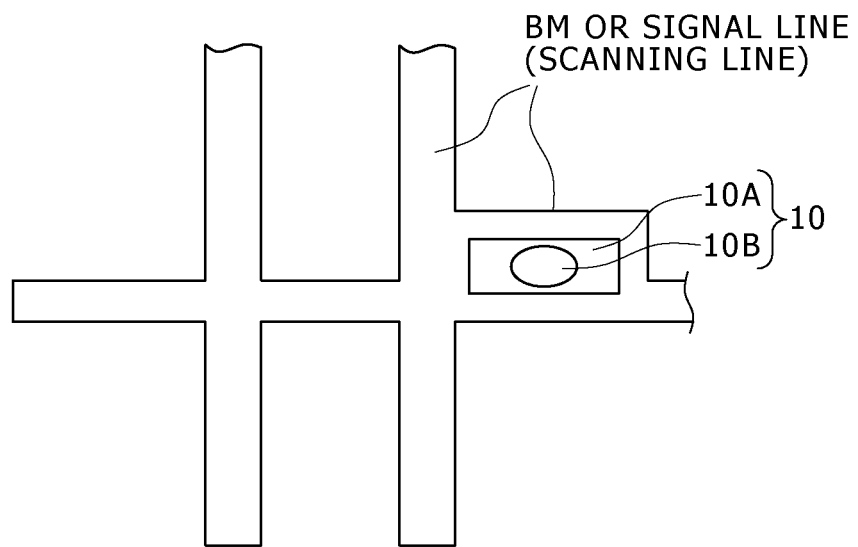
FIGS. 18A and 18B are top plan views showing structures including pattern shapes of spacers of change 2.

For example, as shown in FIG. 18A, for the purpose of effectively hiding the subsidiary spacer 10B behind the black matrix BM or the like, the subsidiary spacer 10B may have an oblong shape. Of course, the subsidiary spacer 10B may have an elongated ellipsoidal shape, a square shape, or any other suitable rectangular shape.

Figure 18B:
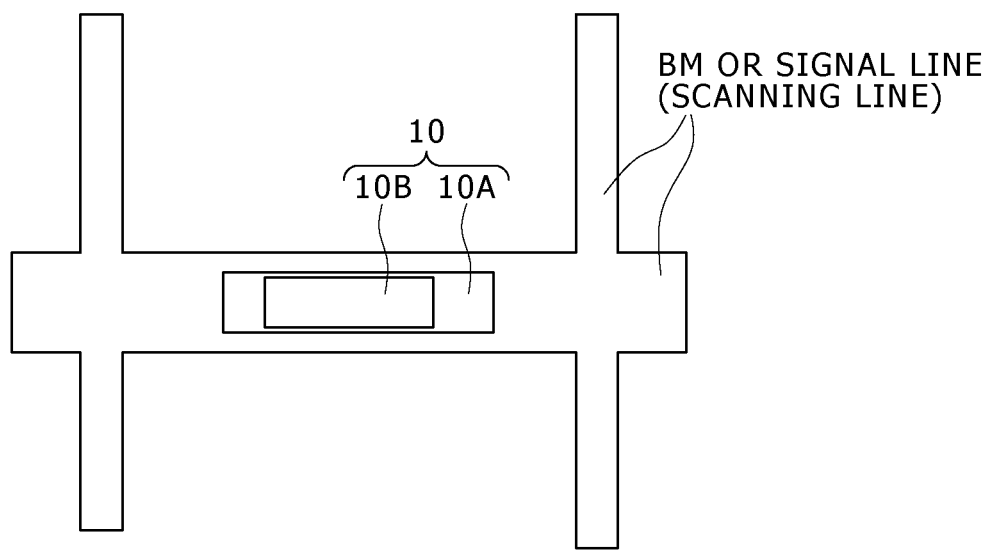

In addition, as shown in FIG. 18B, preferably, the spacer 10 is disposed so as to be perfectly hidden behind the black matrix BM, or the signal line or the scanning line, thereby increasing the cell aperture ratio as much as possible.

In addition, with regard to the ratio between the cross-sectional areas, preferably, the spacer main body 10A has the cross-sectional area which is twice or more as large as that of the subsidiary spacer 10B. It should be noted that "the cross-sectional area" stated herein means an average cross-sectional area within a size in a height direction.

The cross-sectional area of the subsidiary spacer 10B, or the contact area of the subsidiary spacer 10B with the substrate is set as such an area that no low-temperature bubble is generated. For example, when the area of one spacer 10 is S, and the cross-sectional area of the subsidiary spacer 10B is Sb, a ratio of (Sb/S) is preferably in the range of $5 \times 10^4$ to $8 \times 10^2$. In addition, when there is supposed a use condition that as with a writing test or the like by stylus pen, a point weight is repetitively applied, the cross-sectional area of a single spacer 10 is preferably equal to or larger than $100 \, \mu m^2$.

It is noted that the same effect as that in the step is obtained even in the case where the spacer shape is a semi-circular shape so that a cross-sectional area continuously changes.

With regard to a method of manufacturing the semi-circular spacer, a resist showing thermal reflow is used, and in a baking process, a suitable temperature is applied to the resist, whereby a shape of the resist can be made to have the semi-circular shape. In addition, after an isolated dot pattern of a suitable resist is formed, the isolated dot pattern is covered with a planarizing film, thereby making it possible to form a smooth semi-circle.

As set forth hereinabove, according to the first to eighth embodiments and changes, the minimum requirement for the shape of the spacer 10 is that the spacer 10 has "the multiple step structure." In "the multiple step structure" stated herein, the portions which contact the first substrate and the second substrate with the contact areas different from each other, respectively, are formed in at least two steps in one and the other of the surface of the first substrate and the surface of the second substrate on which the predetermined functional layers are formed, respectively. As a result, "the multiple step structure" stated herein means the structure which has one or more steps in at least a part of a circling direction in the spacer peripheral surface existing between the contact surface of one substrate, and the contact surface of the other substrate.

The shape of the spacer 10 has many embodiments which can not be perfectly expressed by the various embodiments and changes described above as long as the shape of the spacer 10 has the multiple step structure.

The present application contains subject matter related to that disclosed in Japanese Priority Patent Application JP 2008-267857 filed in the Japan Patent Office on Oct. 16, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A liquid crystal display device comprising:
a first substrate;
a second substrate;
a plurality of spacers disposed between said first substrate and said second substrate; and
a liquid crystal layer filled between said first substrate and said second substrate supported by said plurality of spacers;
wherein,
each of said plurality of spacers includes a multiple step structure with one or more steps,
each of said plurality of spacers comprises (i) a core portion protruding from said second substrate to said liquid crystal layer, (ii) a cap portion covering said core portion, and (iii) a step corresponding to a protrusion end face edge of said core portion on an outer surface of said cap portion, an alignment protrusion is provided below said second substrate and protrudes from said second substrate to said liquid crystal layer to align liquid crystal molecules, and said core portion of each of said plurality of spacers is made of the same material as said alignment protrusion, and has the same shape as said alignment protrusion.

2. A liquid crystal display device comprising:

a first substrate;

a second substrate;

a plurality of spacers disposed between said first substrate and said second substrate; and a liquid crystal layer filled between said first substrate and said second substrate supported by said plurality of spacers, wherein, (a) each of said plurality of spacers includes
  (1) a multiple step structure with one or more steps,
  (2) a spacer main body formed below said first substrate,
  (3) a sensor electrode disposed on a side of said first substrate and on a protrusion end face of said spacer main body, and
  (4) an inter-electrode short circuit preventing layer formed in a sensor electrode portion on said protrusion end face of said spacer main body, a cross-sectional area of said inter-electrode short-circuit preventing layer being smaller than a cross-sectional area of said spacer main body, said inter-electrode short-circuit preventing layer being made of an insulating material; and (b) each of said plurality of spacers serves as an assembly of said electrode for an electrode contact type sensor.

3. A method of manufacturing a liquid crystal display device, comprising the steps of:

forming a plurality of spacers for holding a first substrate and a second substrate at a predetermined facing interval in at least one of said first substrate and said second substrate between which a liquid crystal layer is held; and sticking said first substrate and said second substrate to each other through said plurality of spacers, and enclosing a liquid crystal within a gap defined by the predetermined facing interval;

wherein the step of forming the plurality of spacers includes the steps of forming a first resist pattern becoming a core portion on said first substrate either after the formation of said plurality of spacers or after the sticking of said first substrate and said second substrate so that a multiple step structure having one or more steps is formed; and forming a second resist pattern so as to cover the first resist pattern thus formed, a step being formed on an outside surface of the second resist pattern due to presence of the first resist pattern.

4. The method of manufacturing a liquid crystal display device according to claim 3, wherein vertical alignment protrusions, each made of the same material as that of the first resist pattern, for adjusting vertical alignment angles of liquid crystal molecules are regularly disposed in an effective display area of said liquid crystal layer concurrently with the formation of said first resist pattern.

* * * * *